(12) United States Patent
Wada et al.

(10) Patent No.: US 10,708,502 B2
(45) Date of Patent: Jul. 7, 2020

(54) CAMERA DEVICE AND SHAKE CORRECTION METHOD

(71) Applicant: PANASONIC I-PRO SENSING SOLUTIONS CO., LTD., Fukuoka (JP)

(72) Inventors: Jyouji Wada, Fukuoka (JP); Masaomi Iizumi, Kanagawa (JP); Hideaki Yamada, Fukuoka (JP); Masamichi Ohara, Osaka (JP); Takayuki Shimaoka, Fukuoka (JP)

(73) Assignee: PANASONIC I-PRO SENSING SOLUTIONS CO., LTD., Fukuoka (JP)

( * ) Notice: Subject to any disclaimer, the term of this patent is extended or adjusted under 35 U.S.C. 154(b) by 93 days.

(21) Appl. No.: 15/923,601

(22) Filed: Mar. 16, 2018

(65) Prior Publication Data
US 2018/0288299 A1    Oct. 4, 2018

(30) Foreign Application Priority Data

Mar. 31, 2017  (JP) ................. 2017-072321

(51) Int. Cl.
*H04N 5/232*    (2006.01)

(52) U.S. Cl.
CPC ....... *H04N 5/2328* (2013.01); *H04N 5/23258* (2013.01)

(58) Field of Classification Search
CPC ... H04N 5/2328; H04N 5/23258; H04N 5/232
See application file for complete search history.

(56) References Cited

U.S. PATENT DOCUMENTS

| 10,341,563 | B2* | 7/2019 | Wada | |
|---|---|---|---|---|
| 2006/0257128 | A1* | 11/2006 | Ishito | G03B 17/00 396/55 |
| 2007/0097219 | A1* | 5/2007 | Nomura | H04N 5/23287 348/208.7 |

(Continued)

FOREIGN PATENT DOCUMENTS

JP    2014-045304 A    3/2014

OTHER PUBLICATIONS

U.S. Appl. No. 15/923,185 to Jyouji Wada et al., filed Mar. 16, 2018.

(Continued)

*Primary Examiner* — Antoinette T Spinks
(74) *Attorney, Agent, or Firm* — Greenblum & Bernstein, P.L.C.

(57) ABSTRACT

A camera device includes a lens on which subject light is incident, an imaging element that images an image based on the subject light, a shake sensor that detects shake of the camera device, a shake correction mechanism that holds a holder which holds the imaging element and performs shake correction on a captured image captured by the imaging element through driving of the holder, a characteristic estimator that estimates characteristics of the lens based on a detection value of the shake sensor and a shake correction amount of the shake correction mechanism, and a controller that causes the shake correction mechanism to drive the holder by using the detection value of the shake sensor and an estimation result of the characteristics of the lens.

6 Claims, 22 Drawing Sheets

(56) References Cited

U.S. PATENT DOCUMENTS

| | | | |
|---|---|---|---|
| 2010/0104270 A1* | 4/2010 | Huang | G03B 17/00 |
| | | | 396/55 |
| 2014/0055670 A1 | 2/2014 | Hongo | |
| 2017/0223347 A1* | 8/2017 | Ezawa | H04N 17/002 |
| 2017/0257573 A1* | 9/2017 | Abe | G06T 7/97 |
| 2017/0272655 A1* | 9/2017 | Sakurai | H04N 5/23209 |
| 2018/0063443 A1* | 3/2018 | Ikeda | H04N 5/2254 |

OTHER PUBLICATIONS

U.S. Appl. No. 15/943,267 to Jyouji Wada et al., filed Apr. 2, 2018.

* cited by examiner

FIG. 17A

| ZOOM POSITION | ... | 15 | 16 | 17 | ... |
|---|---|---|---|---|---|
| OPTICAL ZOOM MAGNIFICATION | ... | 3.2 | 3.25 | 3.3 | ... |

FIG. 17B

| OPTICAL ZOOM MAGNIFICATION | ... | 3.2 | 3.25 | 3.3 | ... |
|---|---|---|---|---|---|
| BIS MOVABLE RANGE | ... | BW3 | BW4 | BW5 | ... |

BW3, BW4, BW5...: SETTING VALUES CALCULATED BY CPU ACCORDING TO OPTICAL ZOOM MAGNIFICATIONS

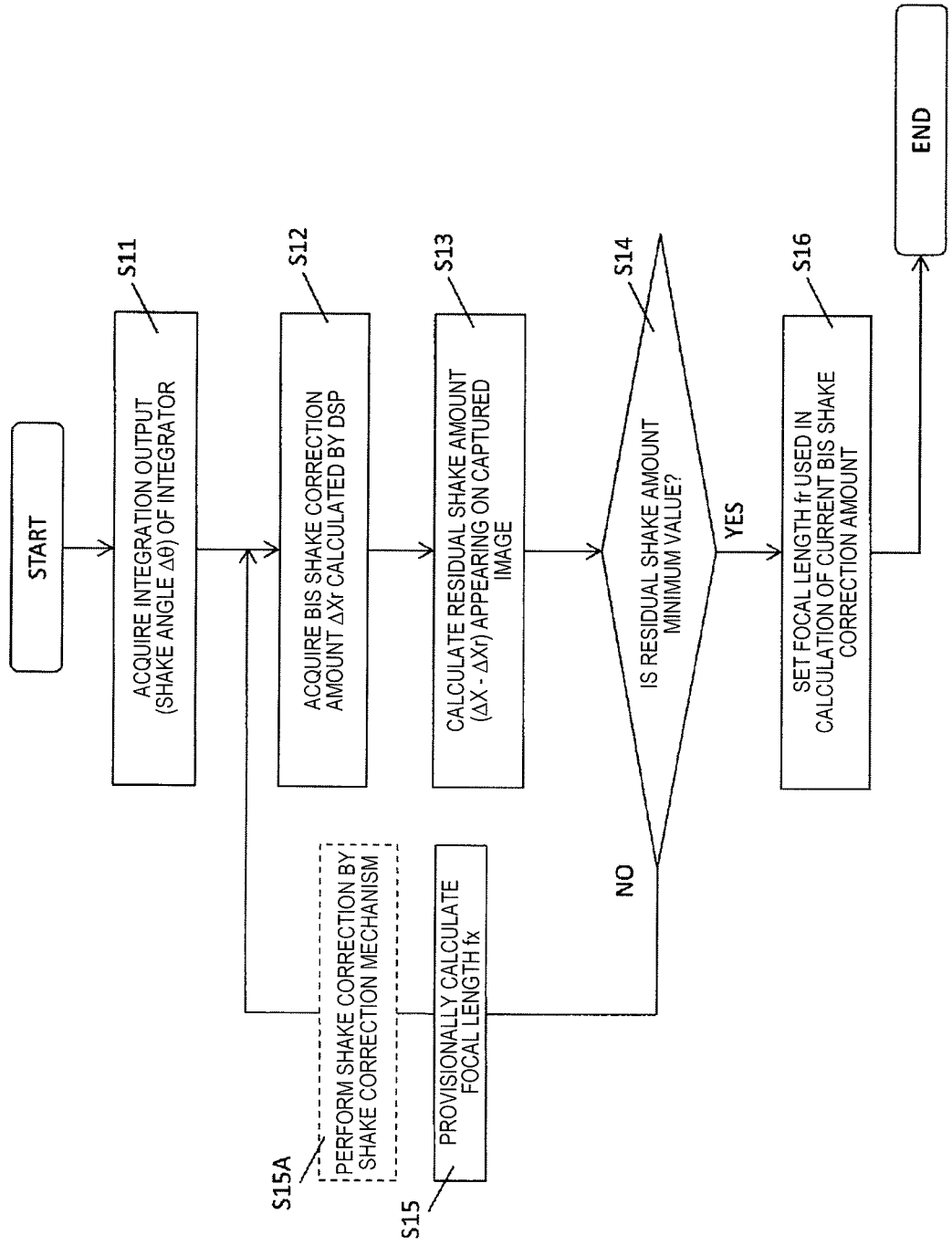

CAMERA DEVICE AND SHAKE CORRECTION METHOD

BACKGROUND

1. Technical Field

The present disclosure relates to a camera device and a shake correction mechanism which corrects influence of shake on a captured image.

2. Description of the Related Art

It is known that an imaging device such as a digital camera is provided with an image stabilization mechanism that shifts a position of an imaging element unit having an imaging element and a low-pass filter (so-called optical filer) therein in order to perform image stabilization at the time of imaging. For example, a camera module of Japanese Patent Unexamined Publication No. 2014-45304 corresponds to an image stabilization function, and can shift a position of an imaging element unit by using an actuator.

However, in the configuration of Japanese Patent Unexamined Publication No. 2014-45304, there is no consideration on a configuration in which a movement amount of the imaging element unit is controlled along with a variation (for example, a variation in a focal length caused by replacement with lenses of which focal lengths are different at the time of maintenance of the camera device) in the focal length of the lens, as the image stabilization function of an electronic device such as a mobile phone having the camera module mounted thereon.

For example, it is considered that the camera device such as the electronic device of Japanese Patent Unexamined Publication No. 2014-45304 is provided in a place in which the device shakes and the camera device is a lens replaceable type. In this case, in the configuration of Japanese Patent Unexamined Publication No. 2014-45304, it is necessary to input and store information of the focal length, as an example of characteristics of a lens to be used after the replacement, in the camera device whenever the lens of the camera device is replaced. Accordingly, it is difficult to reduce to an effort of an operator who performs an operation (for example, an operation for inputting and storing the information of the focal length in the camera device) when the lens is replaced. When the operation of the operator is not performed, the camera device is not able to ascertain the focal length of the lens to be used after the replacement, and is difficult to appropriately control the movement amount of the imaging element unit according to the detection amount of the shake.

SUMMARY

The present disclosure has been made in view of the aforementioned circumstances of the related art, and it is an object of the present disclosure to provide a camera device and a shake correction method which prevent reliability as data of an imaging element from being degraded by estimating lens characteristics changed along with replacement of a lens with high accuracy, reducing an effort of a user who inputs the lens characteristics, and suppressing degradation in quality of a captured image through relaxing of influence of shake of a device main body when the device main body is provided in a place in which the device shakes.

The present disclosure provides a camera device which is a fixed to a fixing target surface, and is provided in a place in which shaking occurs on the fixing target surface. The camera includes a lens on which subject light is incident, an imaging element that images an image based on the subject light, a shake sensor that detects shake of the camera device, a shake correction mechanism that holds a holder which holds the imaging element, and performs shake correction on a captured image captured by the imaging element through driving of the holder based on a detection value of the shake sensor, a characteristic estimator that estimates characteristics of the lens based on the detection value of the shake sensor and a shake correction amount of the shake correction mechanism, and a controller that causes the shake correction mechanism to drive the holder by using the detection value of the shake sensor and an estimation result of the characteristics of the lens.

The present disclosure provides a shake correction method using a camera device which is fixed to a fixing target surface and is provided in a place in which shaking occurs on the fixing target surface. The method includes a step of detecting shake of the camera device, a step of imaging an image based on subject light by an imaging element, a step of performing shake correction on a captured image captured by the imaging element through driving of a holder which holds the imaging element based on a detection value of the detected shake of the camera device, a step of estimating characteristics of a lens on which the subject light is incident based on the detection value of the detected shake of the camera device and a shake correction amount of the captured image, and a step of driving the holder in the shake correction by using the detection value of the detected shake of the camera device and an estimation result of the characteristics of the lens.

According to the present disclosure, it is possible to prevent reliability as data of an imaging element from being degraded since lens characteristics changed along with replacement of a lens is estimated with high accuracy, an effort of a user who inputs the lens characteristics is reduced, and degradation in quality of a captured image is suppressed through relaxing of influence of shake of a device main body when the device main body is provided in a place in which the device shakes.

BRIEF DESCRIPTION OF THE DRAWINGS

FIG. 17A is a table showing an example of a correspondence between zoom positions and optical zoom magnifications;

FIG. 17B is a table showing an example of a correspondence between optical zoom magnifications and BIS movable ranges;

FIG. 22 is a flowchart showing an example of an operation procedure of a coefficient estimator in a lens characteristics estimation mode of the surveillance camera according to Exemplary Embodiment 3 in detail.

Figure 1:
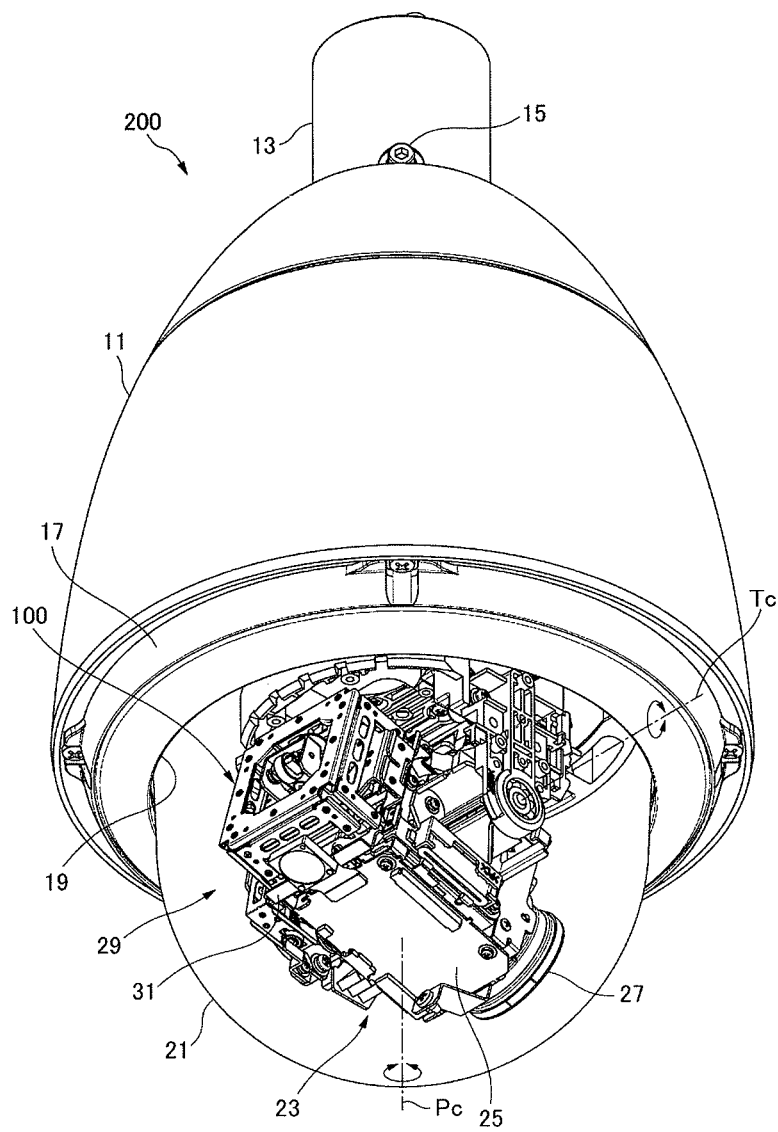
FIG. 1 is a perspective view of a surveillance camera including a shake correction mechanism according to Exemplary Embodiment 1.

DETAILED DESCRIPTION (Background of Exemplary Embodiment 1)

For example, the camera module of Japanese Patent Unexamined Publication No. 2014-45304 considers only the configuration in which the imaging element unit moves in parallel with two axis directions which are perpendicular to an optical axis direction and are perpendicular to each other. Thus, for example, when the configuration described in Japanese Patent Unexamined Publication No. 2014-45304 applies to a camera device such as a surveillance camera, in a case where a place (for example, a place such as a ceiling or a pole) in which the camera device is provided largely shakes, since shake correction is insufficiently performed on an image captured by the camera device, there is a problem that it is difficult to maintain a favorable image.

For example, a sliding mechanism for correcting the shake such as disturbance within a camera in the camera device such as the surveillance camera is known. This sliding mechanism causes an imaging element to slide in a direction parallel to a surface of a board to which the imaging element is attached so as to move in a direction opposite to a direction in which the shake occurs. For example, a sliding method of sliding a ball by disposing the ball between movable parts and rolling the ball is used. However, since the ball and a flat plate are in point-contact with each other in the sliding mechanism for rolling the ball, since stress concentrates and appropriate biasing force is less likely to be applied and a range in which the ball rolls is very small, friction and wear intensively occurs in this portion. As a result, since failure is likely to occur in an operation and a flat surface is less likely to be maintained over a long period of time, there is a problem that durability is degraded. Thus, since hysteresis occurs and a starting torque increases, there is a problem that smooth operation control is not able to be performed. In a mechanism in which looseness, friction force, or backlash occurs, there is also a problem that the smooth operation control is not able to be performed. Dust generated due to the friction adheres to the ball, and thus, there is also a problem that an operation at the time of sliding becomes unstable.

Meanwhile, according to a movement mechanism using a ball screw, it is possible to reduce the looseness, the friction force, or the backlash. However, since an internal structure within the camera device is complicated, there is a problem that cost increases and weight also increases.

In Exemplary Embodiment 1 to be stated below, examples of a shake correction mechanism and a camera device capable of smoothly realizing an operation in two axis directions and maintaining the acquisition of a favorable image over a long period of time while securing durability by reducing the influence of the shake with a simple structure will be described.

Hereinafter, exemplary embodiments in which a shake correction mechanism and a camera device according to the present disclosure are specifically disclosed will be described in detail by appropriately referring to the drawings. Unnecessarily detailed description may be omitted. For example, the detailed description of well-known matters or the redundant description of substantially the same components may be omitted. Such omission is intended to prevent the following description from being unnecessarily redundant and to help those skilled in the art easily understand the present disclosure. The accompanying drawings and the following description are provided in order for those skilled in the art to fully understand the present disclosure, and are not intended to limit the subject matters defined in the claims.

In the following exemplary embodiments, a case where a surveillance camera capable of imaging a predetermined position or area as a subject is used as an example of the camera device according to the present disclosure will be described.

Exemplary Embodiment 1

FIG. 1 is a perspective view of surveillance camera 200 including shake correction mechanism 100 according to Exemplary Embodiment 1.

For example, shake correction mechanism 100 according to the present exemplary embodiment is applicable to dome type surveillance camera 200 shown in FIG. 1. For example, surveillance camera 200 includes a cylindrical outer cover 11 having a conical surface. Mounting tube 13 to be fixed to a ceiling, a wall surface, a fixing target surface of a pole, or a mounting target object such as a pole is provided at an upper end of the outer cover 11. Surveillance camera 200 is attached so as to hang from the pole while the mounting tube 13 is at the top in a vertical direction. Outer cover 11 functions as a cover against rain. Mounting tube 13 is screwed by using multiple fixation bolts 15 for fixing inserted bolts at equidistant intervals in a circumferential direction. Mounting tube 13 passes through the inside of outer cover 11. A power line or a signal line guided to the pole is introduced into outer cover 11 through mounting tube 13.

For example, a lower surface of outer cover 11 is a circular opening. For example, annular ring cover 17 is detachably attached to the circular opening. For example, a hemisphere of dome cover 21 made of a transparent resin material hangs from inner hole 19 of ring cover 17. Dome cover 21 includes a hemisphere outer shell and a cylinder connected to a circumference of an opening of the hemisphere outer shell with the same radius. The cylinder includes a flange (not shown) to be fixed to ring cover 17 on a side opposite to the hemisphere outer shell. Dome cover 21 is fixed such that the flange is disposed between ring cover 17 and outer cover 11.

For example, dome cover 21 is made of a resin material having excellent moldability and transparency as a board material. An organic resin material or an inorganic resin material may be used as the resin material. For example, in the present exemplary embodiment, an organic resin material such as polycarbonate may be used as a board material of the hemisphere outer shell. Since the polycarbonate is hard and has high impact resistance, the polycarbonate is preferably used. A resin having favorable transparency, such as acryl, may also be used.

The inside of dome cover 21 is a camera accommodation space. Camera 23 of which pan rotation and tilt rotation around pan rotation center Pc in a direction in parallel with the vertical direction and tilt rotation center Tc crossing pan rotation center Pc in an orthogonal direction are performed is disposed in the camera accommodation space. Camera 23 includes lens unit 27 provided in camera housing 25. In-body image stabilizer (BIS) mechanism unit 29 that performs a correction process (hereinafter, may be referred to as "in-body image stabilizer (BIS)") in which the influence of the shake of camera 23 is considered is provided in camera housing 25. BIS mechanism unit 29 includes shake correction mechanism 100 to be fixed to lens mount base 31 as an example of a base of camera housing 25. An imaging element (not shown) is attached to shake correction mechanism 100.

Figure 2:
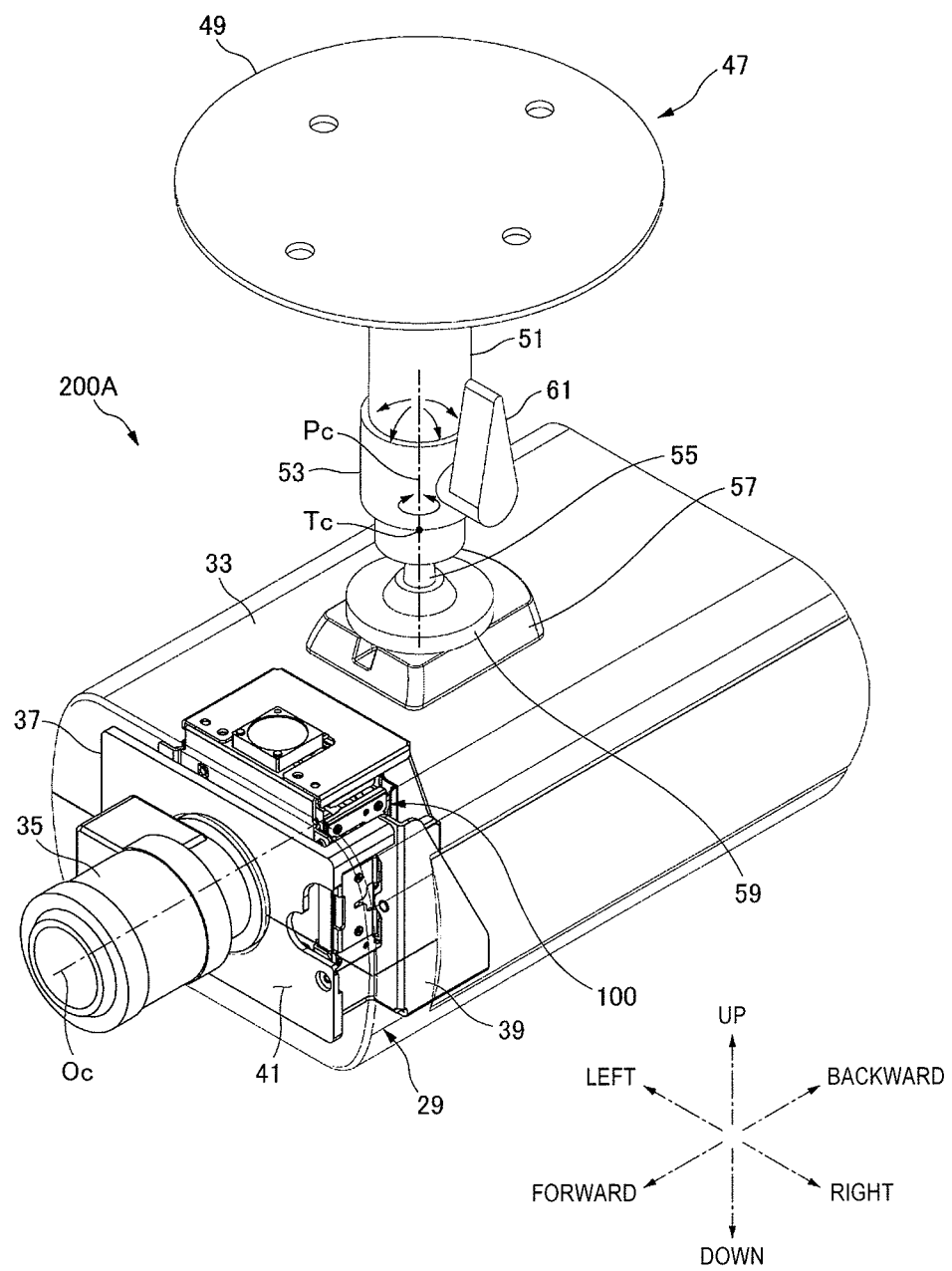
FIG. 2 is a transparent perspective view showing another surveillance camera including the shake correction mechanism according to Exemplary Embodiment 1 and a part of an internal structure.

FIG. 2 is a transparent perspective view showing another surveillance camera 200A including the shake correction mechanism according to Exemplary Embodiment 1 and a part of an internal structure.

Although a direction in the present exemplary embodiment, up, down, forward, backward, left, and right directions are directions of arrows shown in FIG. 2, these directions are similarly applicable to surveillance camera 200 shown in FIG. 1.

Similarly to dome type surveillance camera 200 shown in FIG. 1, shake correction mechanism 100 according to the present exemplary embodiment is applicable to box type surveillance camera 200A shown in FIG. 2. Surveillance camera 200A accommodates camera 23 within a box-shaped camera housing 33.

For example, surveillance camera 200 or 200A according to the present exemplary embodiment is fixed onto a fixing target surface, and is provided in a place in which shaking occurs on the fixing target surface. Examples of the place in which shaking occurs on the fixing target surface include a transmission line, a pole, a ship, a bridge, a pedestrian overpass, a construction site, and a road traffic light, and are not limited to these places.

In surveillance camera 200A shown in FIG. 2, camera 23 includes lens unit 35. In surveillance camera 200 shown in FIG. 1, camera 23 includes lens unit 27. BIS mechanism unit 29 that performs a correction process (in-body image stabilizer) in which the influence of the shake of camera 23 is considered is provided in camera 23. BIS mechanism unit 29 includes shake correction mechanism 100 to be fixed to lens mount base 37 as an example of a base of camera housing 33. Shake correction mechanism 100 is fixed to lens mount base 37. Lens mount base 37 is fixed to camera housing 33. An imaging element to be described below is attached to shake correction mechanism 100.

Figure 3:
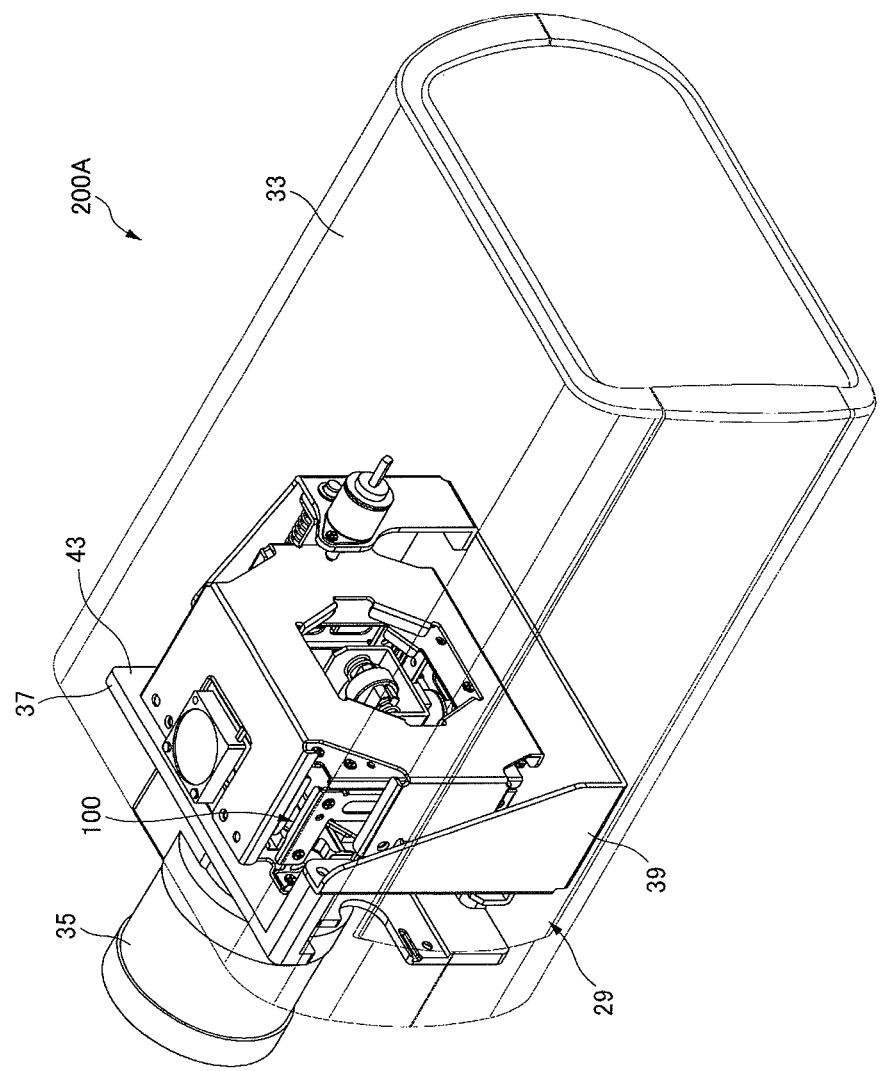
FIG. 3 is a transparent perspective view when the surveillance camera shown in FIG. 2 is viewed diagonally viewed from the upper right on the rear side.

FIG. 3 is a transparent perspective view when surveillance camera 200A shown in FIG. 2 is diagonally viewed from the upper right on the rear side.

Lens mount base 37 is fixed to camera housing 33 by fixation bracket 39. Lens mount base 37 supports lens unit 35 on one surface (for example, front surface 41 shown in FIG. 2). Light reception window 45 (see FIG. 6) is opened in the other surface (for example, rear surface 43) of lens mount base 37 perpendicular to optical axis Oc passing through lens unit 35.

For example, surveillance camera 200A is attached to a ceiling surface, a wall surface, or a hole. Camera mounting base 47 shown in FIG. 2 is fixed to the ceiling surface, the wall surface, or the pole. Camera mounting base 47 includes fixation flange 49 as an example of the fixing target surface, support column 51 which protrudes from fixation flange 49, and a direction adjuster 53 formed at a front end of support column 51. Direction adjuster 53 includes tripod mounting screw 55 at a front end. Tripod mounting screw 55 is screwed with tripod mounting seat 57 of camera housing 33, and is fixed by fixation ring 59.

Direction adjuster 53 supports a ball (not shown) provided at a base end of tripod mounting screw 55 to a bearing by a spherical kinematic pair. Accordingly, tripod mounting screw 55 enables a pivoting motion in which the ball changes its orientation or rotates within the bearing. Direction adjuster 53 supports camera housing 33 by tripod mounting screw 55 such that the pan rotation around pan rotation center Pc in the direction in parallel with the vertical direction is enabled and supports the camera housing such that the tilt rotation around tilt rotation center Tc on pan rotation center Pc is enabled.

When surveillance camera 200A is attached to the ceiling surface, the wall surface, or the pole, an imaging direction is set. For example, when the surveillance camera is attached to the ceiling surface, the imaging direction is generally set so as to slightly tilt. Surveillance camera 200A of which the imaging direction is set fixes tripod mounting screw 55 (spherical kinematic pair) by fixation lever 61 of direction adjuster 53.

Shake correction mechanism 100 may be provided in any one of surveillance camera 200 and surveillance camera 200A. Hereinafter, a case where shake correction mechanism 100 is provided in surveillance camera 200A will be described as a representative example.

Figure 4:
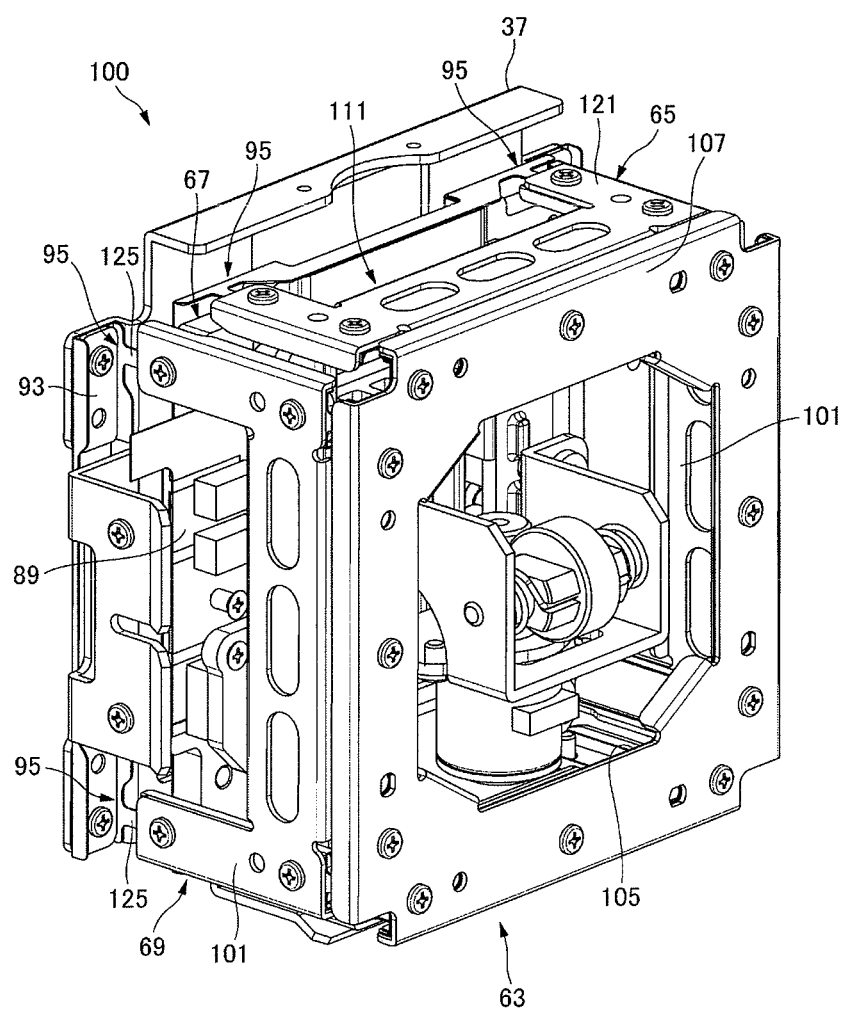
FIG. 4 is a perspective view when the shake correction mechanism shown in FIG. 3 is diagonally viewed from the upper right on the rear side.

FIG. 4 is a perspective view when shake correction mechanism 100 shown in FIG. 3 is diagonally viewed from the upper right on the rear side.

Shake correction mechanism 100 includes lens mount base 37, initial-stage vibration member 63 as an example of a first-stage vibration member, next-stage vibration member 65 as an example of a second-stage vibration member, and element holder 67. In shake correction mechanism 100, initial-stage vibration member 63 to which next-stage vibration member 65 and element holder 67 are assembled is fixed to lens mount base 37.

Figure 5:
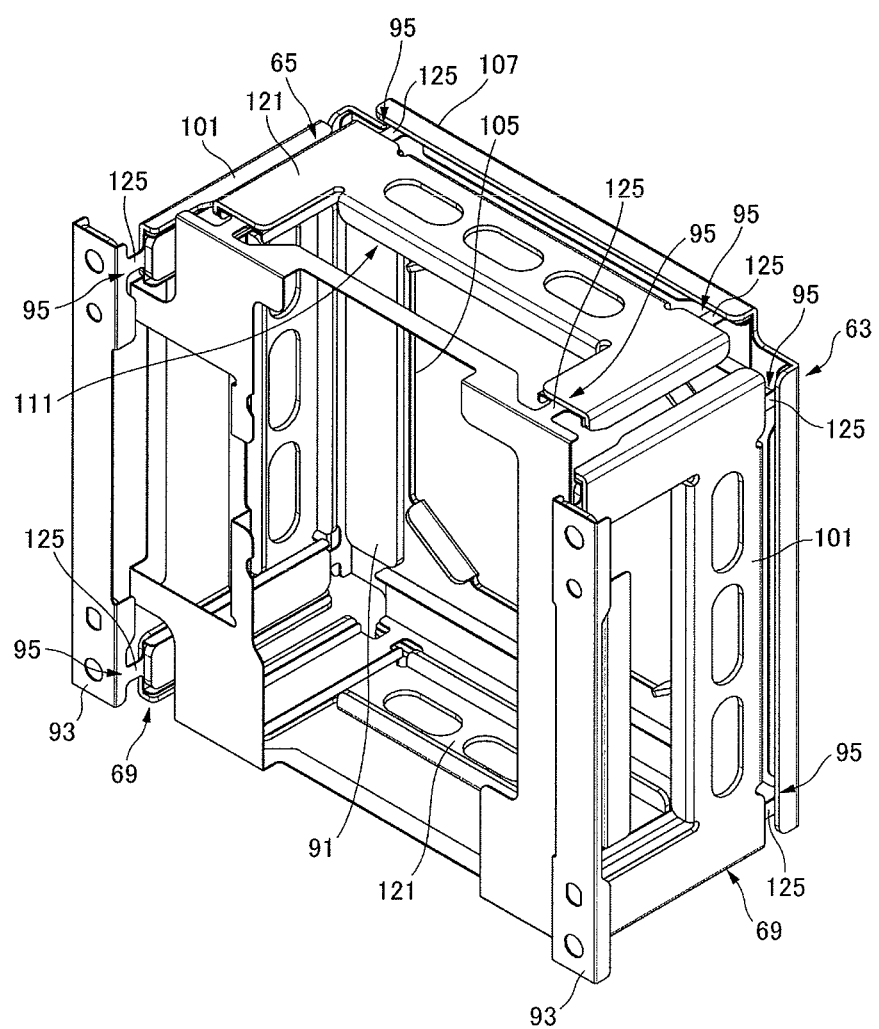
FIG. 5 is a perspective view when the shake correction mechanism shown in FIG. 3 is diagonally viewed from the upper right on the front side.

FIG. 5 is a perspective view when shake correction mechanism 100 shown in FIG. 3 is diagonally viewed from the upper right on the front side.

In shake correction mechanism 100, next-stage vibration member 65 is disposed between a pair of legs 69 of initial-stage vibration member 63. Initial-stage vibration member 63 moves while being fixed to lens mount base 37. Next-stage vibration member 65 is supported on the inside of initial-stage vibration member 63 so as to be movable. That is, initial-stage vibration member 63 and next-stage vibration member 65 are assembled in two stages in a nested structure. Next-stage vibration member 65 which is movable while being attached to initial-stage vibration member 63 is separated from lens mount base 37 without interference. That is, next-stage vibration member 65 is disposed so as to face lens mount base 37 in a non-contact manner.

Figure 6:
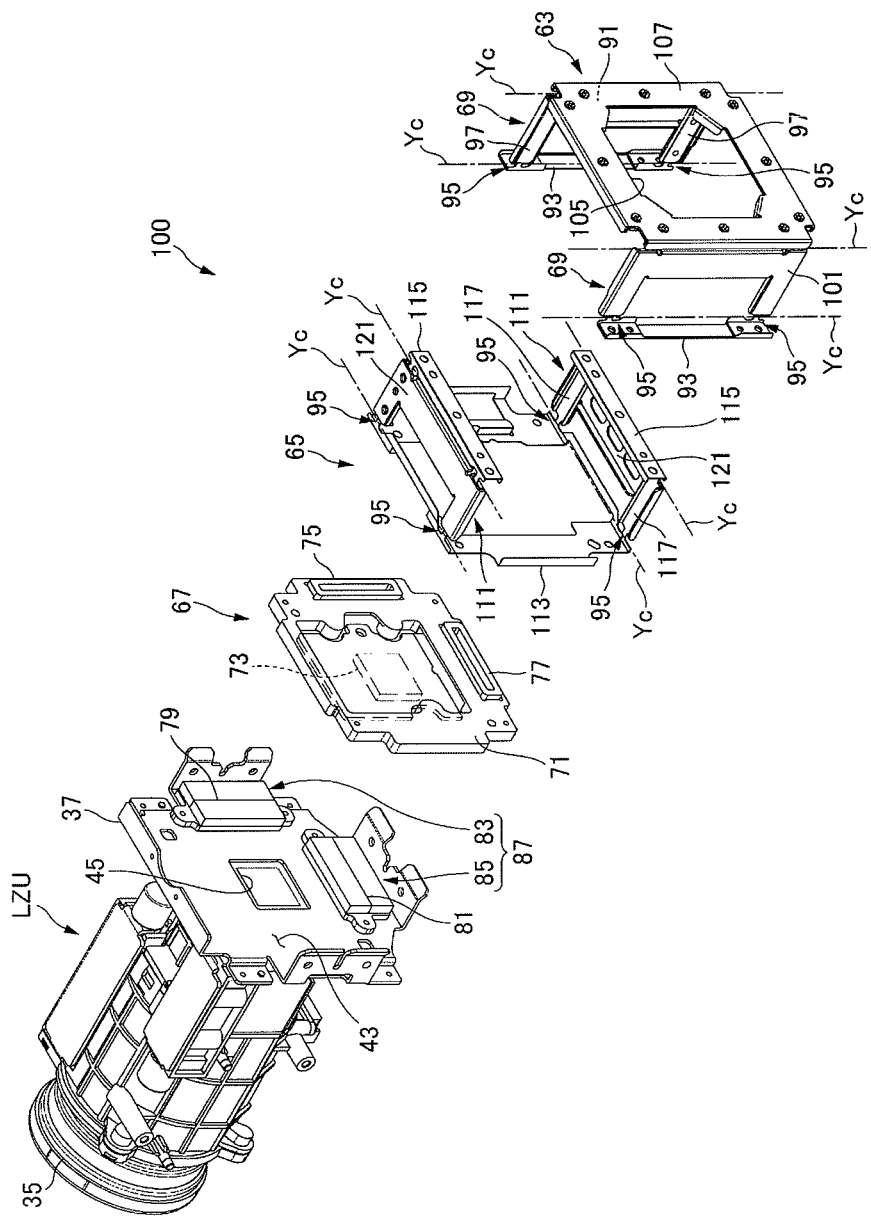
FIG. 6 is an exploded perspective view of a lens unit, a lens mount base, an element holder, an initial-stage vibration member, and a next-stage vibration member.

FIG. 6 is an exploded perspective view of lens unit 27, lens mount base 31, element holder 67, initial-stage vibration member 63, and next-stage vibration member 65.

Element holder 67 is fixed to next-stage vibration member 65. Element holder 67 includes a substantially quadrangular heat sink 71. A plurality of cooling fins (not shown) is formed at heat sink 71. Heat sink 71 receives heat from imaging element 73 through thermal conduction. Heat sink 71 discharges heat transferred from imaging element 73 into air by the cooling fins. That is, imaging element 73 is air-cooled.

First coil 75 is attached to a vertical side of two adjacent sides of element holder 67 which are perpendicular to each other, and second coil 77 is attached to a horizontal side. First coil 75 and first magnet 79 constitute first linear motor 83, and second coil 77 and second magnet 81 constitute second linear motor 85. These magnets are provided on two adjacent sides of lens mount base 37 so as to correspond to the first coil 79 and the second coil 81. In other words, first linear motor 83 includes first coil 75 and first magnet 79, and second linear motor 85 includes second coil 77 and second magnet 81. First linear motor 83 and second linear motor 85 constitute actuator 87 for moving element holder 67 in two axis directions.

Actuator 87 drives element holder 67 (in other words, imaging element 73) in the left and right directions by first linear motor 83, and drives element holder 67 (in other words, imaging element 73) in the up and down directions by second linear motor 85.

Figure 7:
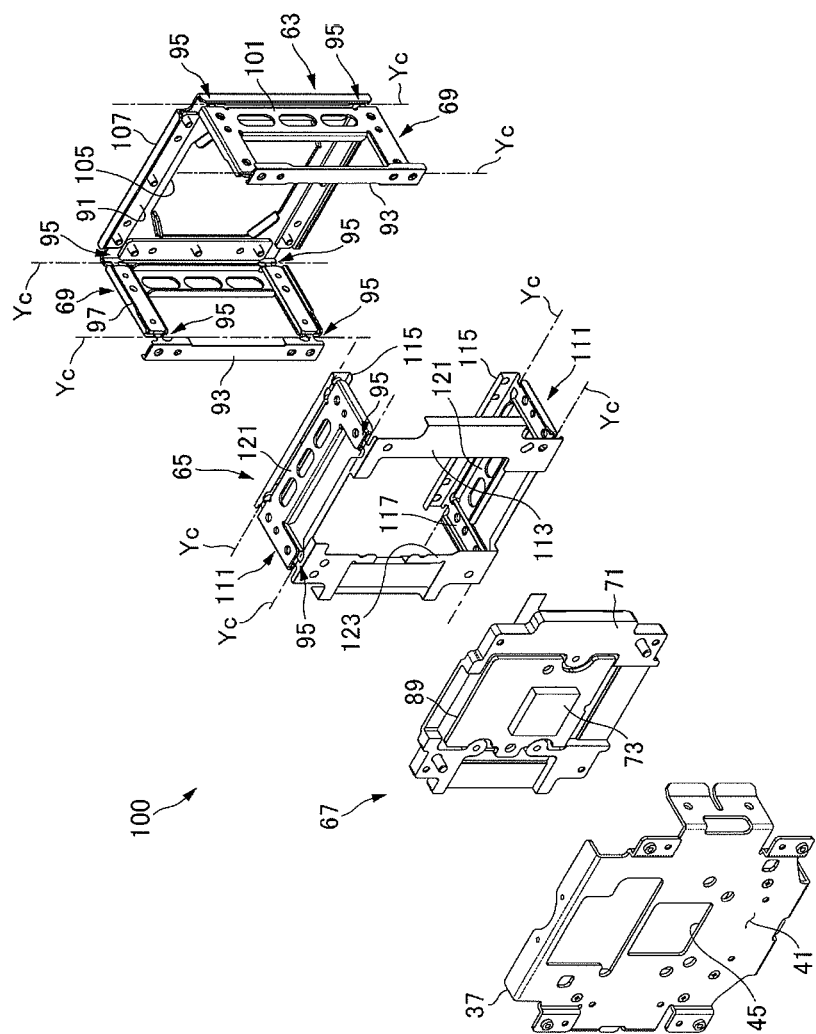
FIG. 7 is an exploded perspective view when a lens mount base, an element holder, an initial-stage vibration member, and a next-stage vibration member of FIG. 6 are viewed from the front side.

FIG. 7 is an exploded perspective view when lens mount base 31, element holder 67, initial-stage vibration member 63, and next-stage vibration member 65 of FIG. 6 are viewed from the front side.

Board 89 for mounting imaging element 73 is attached to a front surface (that is, a surface facing a rear surface 43 of lens mount base 37) of element holder 67. The light reception surface (in other words, imaging surface) is in parallel with lens mount base 37, and imaging element 73 mounted on board 89 is disposed so as to face light reception window 45. That is, element holder 67 is fixed to a surface of coupler 113, to be described below, of next-stage vibration member 65 facing light reception window 45, and imaging element 73 mounted on board 89 receives imaging light (in other words, light concentrated by a lens (not shown) within lens unit 35) from light reception window 45.

Figure 8:
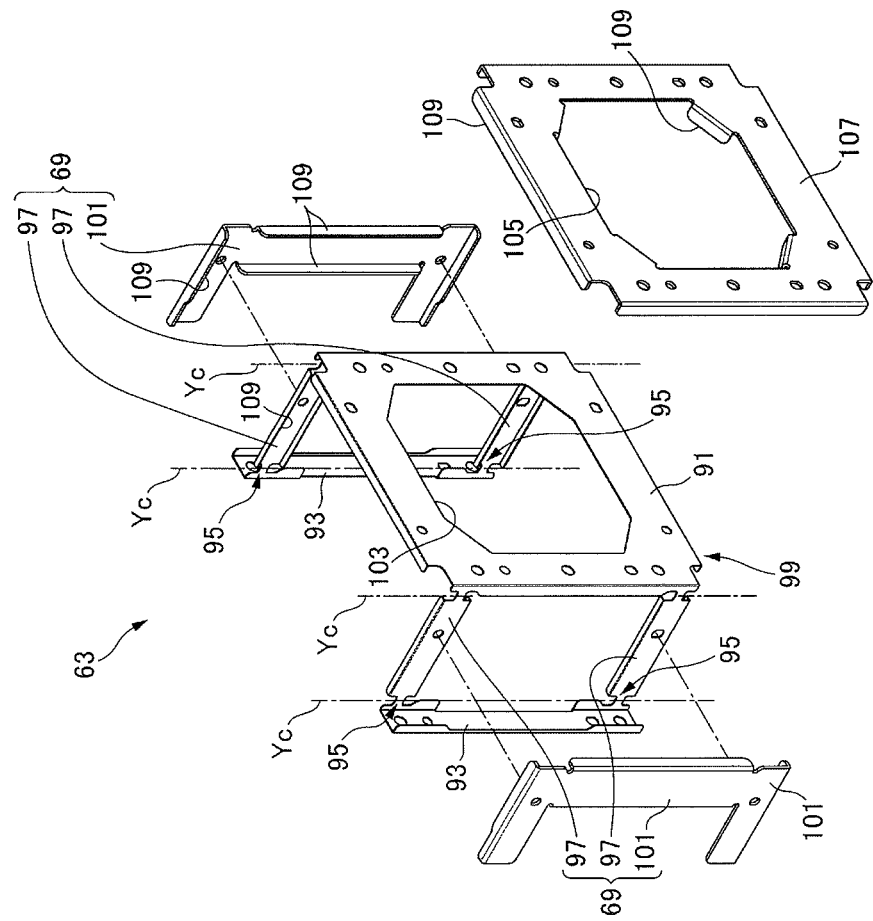
FIG. 8 is an exploded perspective view of the initial-stage vibration member shown in FIG. 6.

FIG. 8 is an exploded perspective view of initial-stage vibration member 63 shown in FIG. 6.

Initial-stage vibration member 63 includes a pair of legs 69 which sandwiches optical axis Oc in the center. Legs 69 are in parallel with optical axis Oc. A pair of legs 69 is connected to coupler 91 having a surface on which leg base ends thereof are perpendicular to optical axis Oc, and has a gate shape.

Initial-stage vibration member 63 includes leg end fixers 93 bent outwards at a right angle at leg front ends on gate-shaped open sides (in other words, a side to be fixed to lens mount base 37). Leg end fixers 93 are fixed on rear surface 43 of lens mount base 37 by screws (not shown).

Initial-stage vibration member 63 includes four flexible parts 95, which vibrates in vibration center Yc in a direction perpendicular to optical axis Oc at a right angle, between leg end fixers 93 and the leg front ends and between leg base ends and coupler 91.

Initial-stage vibration member 63 includes a pair of parallel leg pillar plates 97 formed by vertically bending the pair of legs 69 from coupler 91 in the direction in parallel with optical axis Oc. Accordingly, coupler 91 is supported by lens mount base 37 through leg end fixers 93 by using a total of four leg pillar plates 97 which are paired on the left and right sides.

In shake correction mechanism 100, the legs (for example, legs 69 and 111) of initial-stage vibration member 63 and next-stage vibration member 65, the couplers (for example, couplers 91 and 113), the leg end fixers (for example, leg end fixers 93 and 115), and flexible parts 95 are integrally formed by a leaf spring 99 formed by bending one metal plate. An alloy material having spring properties may be preferably used as flexible part 95. For example, phosphor bronze or stainless steel may be used as the alloy material having spring properties. For example, in initial-stage vibration member 63, leaf spring 99 which is a main part is integrally formed by punching, drilling, and bending the phosphor bronze or the stainless steel through press processing. Leg pillar plates 97 constituting leg 69 and reinforcement plate 107 may be fastened by a screw, or may be coupled through spot welding. Similarly, leg pillar plates 117 constituting leg 111 and reinforcement plate 121 may be fastened by a screw, or may be coupled through stop welding. Reinforcement plate 107 and coupler 91 may be fastened by a screw, or may be coupled through stop welding. Since reinforcement plates 101, 107, and 121 are members for raising rigidity, the reinforcement plates are not limited to the metal. Resin may be used as the reinforcement plates, or members integrally formed with leaf spring 99 through molding may be used as the reinforcement plates.

In initial-stage vibration member 63, a pair of leg pillar plates 97 of leg 69 is integrally fixed by screws (not shown) by a U-shaped reinforcement plate 101 in a portion except for flexible parts 95.

Octagonal hole 103 is formed in a central portion of coupler 91. Quadrangular reinforcement plate 107 including hole 105 having the same area as an area of hole 103 is fixed to coupler 91 by screws (not shown). Reinforcement plate 107 suppresses deformation of coupler 91 having hole 103 formed therein in a twisting direction. Accordingly, leaf spring 99 demonstrates spring properties in a portion other than portions to which reinforcement plates 101 and 107 are fixed, that is, flexible parts 95. A link operation structure is established by four flexible parts 95 of initial-stage vibration members 63 and four flexible parts 95 of next-stage vibration member 65. Accordingly, leg end fixers 93 and reinforcement plate 107 of initial-stage vibration member 63 and coupler 113 and leg end fixers 115 of next-stage vibration member 65 may move almost in parallel with each other.

In order to suppress deformation, ribs 109 formed by bending edges are formed at leg end fixers 93, leg pillar plates 97, coupler 91, reinforcement plates 101, and reinforcement plate 107 of leaf spring 99 when necessary. Ribs 109 are not formed at flexible parts 95.

Figure 9:
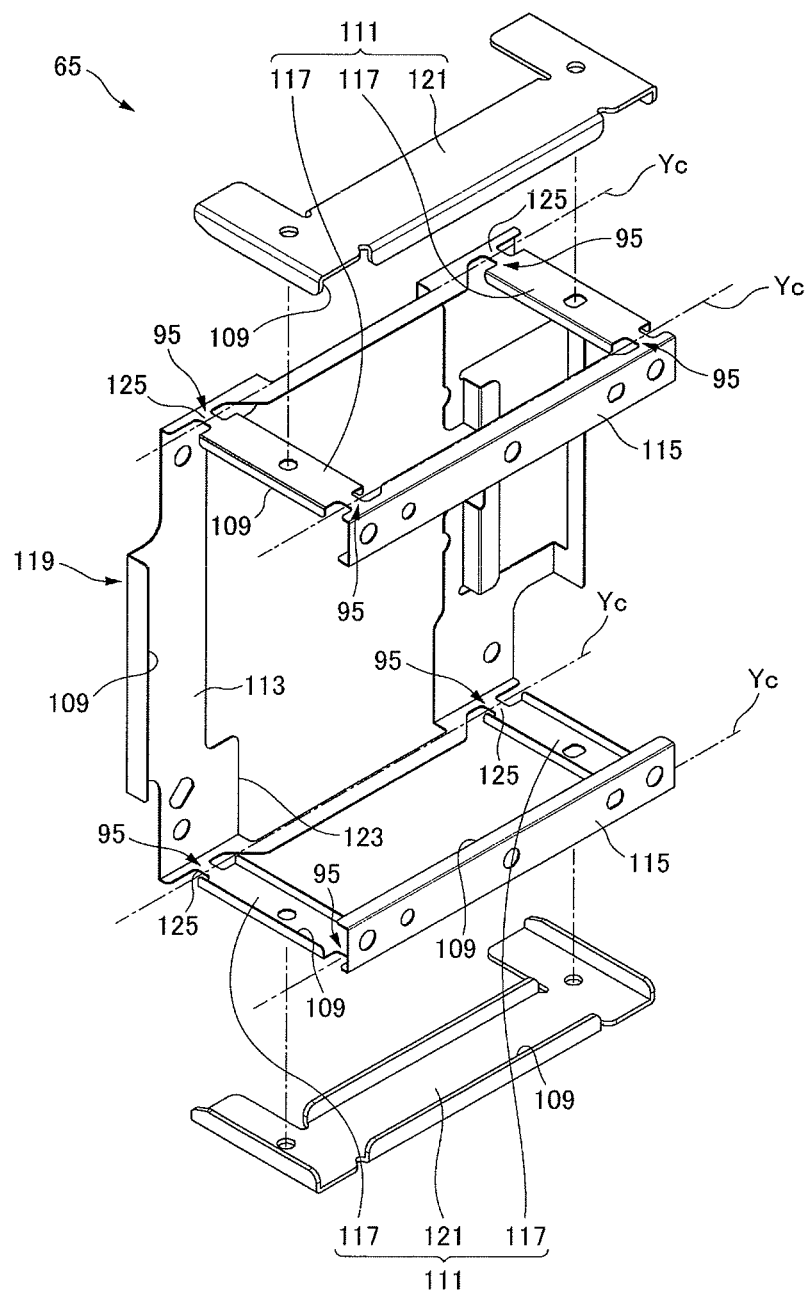
FIG. 9 is an exploded perspective view of the next-stage vibration member shown in FIG. 6.

FIG. 9 is an exploded perspective view of next-stage vibration member 65 shown in FIG. 6.

Hereinafter, the description of the contents overlapping with the description of initial-stage vibration member 63 will be omitted in the description of next-stage vibration member 65.

Next-stage vibration member 65 includes legs 111 having substantially the same structure as those of initial-stage vibration member 63, coupler 113, leg end fixers 115, and flexible parts 95, and has substantially the same configuration as that of initial-stage vibration member 63. That is, next-stage vibration member 65 includes a pair of legs 111 which sandwiches optical axis Oc in the center. The pair of legs 111 is connected to coupler 113 having a surface on which leg base ends are perpendicular to optical axis Oc, and has a gate shape.

Next-stage vibration member 65 includes leg end fixers 115 formed at leg front ends on a gate-shaped open side (in other words, a side to be fixed to initial-stage vibration member 63) by being bent inwards at a right angle. Leg end fixers 115 are fixed on a surface of coupler 91 of initial-stage vibration member 63 facing light reception window 45 by screws (not shown).

Next-stage vibration member 65 includes four flexible parts 95, which vibrates in vibration center Yc in a direction perpendicular to optical axis Oc at a right angle, between leg end fixers 115 and the leg front ends and between leg base ends and coupler 113.

Next-stage vibration member 65 includes a pair of parallel leg pillar plates 117 formed by vertically bending the pair of legs 111 from coupler 113 in the direction in parallel with optical axis Oc. Accordingly, coupler 113 is supported by initial-stage vibration member 63 through leg end fixers 115 by using a total of four leg pillar plates 117 which are paired on the left and right sides.

As stated above, similarly to initial-stage vibration member 63, leg end fixers 115, leg pillar plates 117, and coupler 113 are also integrally formed by leaf spring 119 in next-stage vibration member 65.

In next-stage vibration member 65, a pair of leg pillar plates 117 of leg 111 is integrally fixed to U-shaped reinforcement plate 121 in a portion except for flexible parts 95 by screws (not shown).

Quadrangular hole 123 is formed in a central portion of coupler 113. Element holder 67 described above is fixed to a front surface of coupler 113 by screws (not shown). Element holder 67 is fixed to coupler 113. Thus, heat sink 71 is disposed in hole 123, and passes through coupler 113. A dedicated reinforcement plate is not attached to coupler 113. Alternatively, element holder 67 is fixed to coupler 113. Element holder 67 suppresses deformation of coupler 113 having hole 123 formed therein in a twisting direction. That is, in next-stage vibration member 65, an increase in the number of components is suppressed by using element holder 67 instead of the reinforcement plate.

In order to suppress deformation, ribs 109 formed by bending edges are also formed at leg end fixers 115, leg pillar plates 117, coupler 113, and reinforcement plates 121 of leaf spring 119 in next-stage vibration member 65, when necessary. Similarly to initial-stage vibration member 63, ribs 109 are not formed at the flexible parts 95.

Next-stage vibration member 65 having substantially the same structure as that of initial-stage vibration member 63 is rotated by 90 degrees around optical axis Oc from initial-stage vibration member 63, the gate-shaped open side of initial-stage vibration member 63 is rotated (that is, is rotated by 180 degrees), and leg end fixers 115 are fixed to a surface of coupler 91 of initial-stage vibration member 63 facing light reception window 45.

Figure 10:
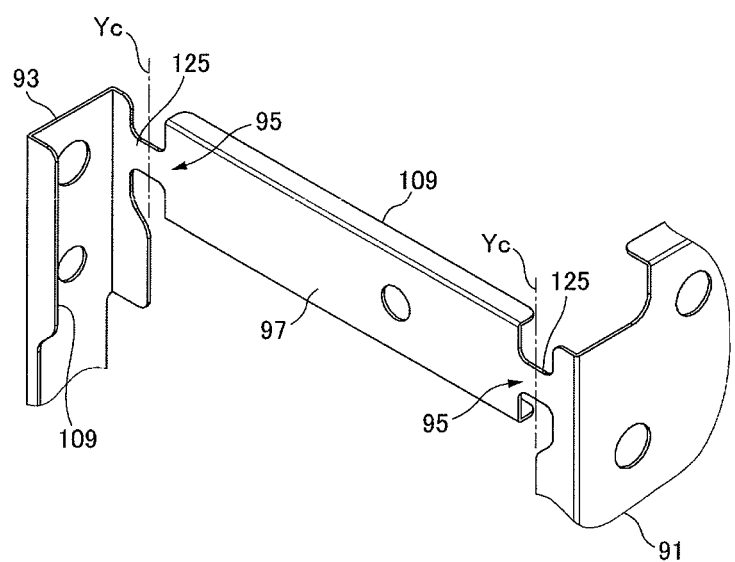
FIG. 10 is an enlarged perspective view of main parts of a leg pillar plate.

FIG. 10 is an enlarged perspective view of main parts of leg pillar plate 97.

In initial-stage vibration member 63 and next-stage vibration member 65, flexible parts 95 described above are formed by binding parts 125. Binding parts 125 are formed at a leg front end of leg pillar plate 97 (leg pillar plate 117) which is a boundary between leg end fixer 93 (leg end fixer 115) and this leg pillar plate and at a leg base end of leg pillar plate 97 (leg pillar plate 117) which is a boundary between coupler 91 (coupler 113) and this leg pillar plate so as to have narrow plate width.

Hereinafter, an operation in the configuration of shake correction mechanism 100 described above will be described.

Figure 11:
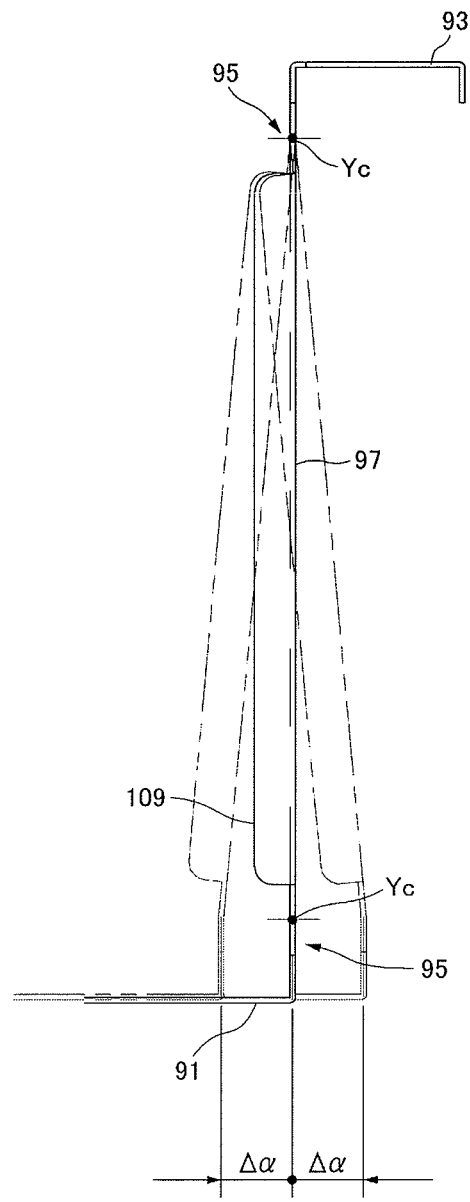
FIG. 11 is an operation explanatory diagram when an initial-stage left leg of the initial-stage vibration member shown in FIG. 6 is viewed in plan view.

FIG. 11 is an operation explanatory diagram when an initial-stage left leg of initial-stage vibration member 63 shown in FIG. 6 is viewed in plan view.

Since initial-stage vibration member 63 and next-stage vibration member 65 have substantially the same structure, the description of common parts will be described by using initial-stage vibration member 63 as a representative example.

In shake correction mechanism 100 according to the present exemplary embodiment, initial-stage vibration member 63 and next-stage vibration member 65 which have the gate shape are provided in two stages. For example, initial-stage vibration member 63 constitutes a mechanism in which legs 69, coupler 91 and leg end fixers 93 are used as machine elements and these parts move relatively. Gate-shaped leg front ends of leg front end of initial-stage vibration member 63 are fixed by only leg end fixers 93.

Leg end fixers 93 and legs 69 are connected by flexible parts 95 shown in FIG. 11 and legs 69 and coupler 91 are connected by the flexible parts. Flexible parts 95 freely vibrate in vibration center Yc in the same direction perpendicular to optical axis Oc at a right angle. Flexible parts 95 between legs 69 and leg end fixers 93 are mainly bent, and thus, coupler 91 moves in left and right directions by movement amount Δa with a typical position as its center. That is, in initial-stage vibration member 63, legs 69, coupler 91, and leg end fixers 93 constitute a 4-joint chain (machine elements capable of being relatively displaced are connected in a ring shape) connected by four kinematic pairs (a pair of parts that is relatively displaced) vibrating in vibration center Yc. The same is true for next-stage vibration member 65.

In a configuration example according to the present exemplary embodiment, the pair of parts which is regarded as the kinematic pair and is relatively displaced is constituted by flexible parts 95. For example, the pair of parts is flexible parts 95 that connect leg end fixers 93 and the leg front ends. Flexible parts 95 are elastically deformed within an elastic range. In the configuration example according to the present exemplary embodiment, since vibration center Yc is flexible part 95, the flexible parts move strictly. Since a flexible region is a very small region positioned between other rigid bodies, the shift of flexible part 95 does not largely influence a vibration direction. Accordingly, it is assumed that flexible part 95 vibrates in virtual vibration center Yc in the present specification.

Figure 12:
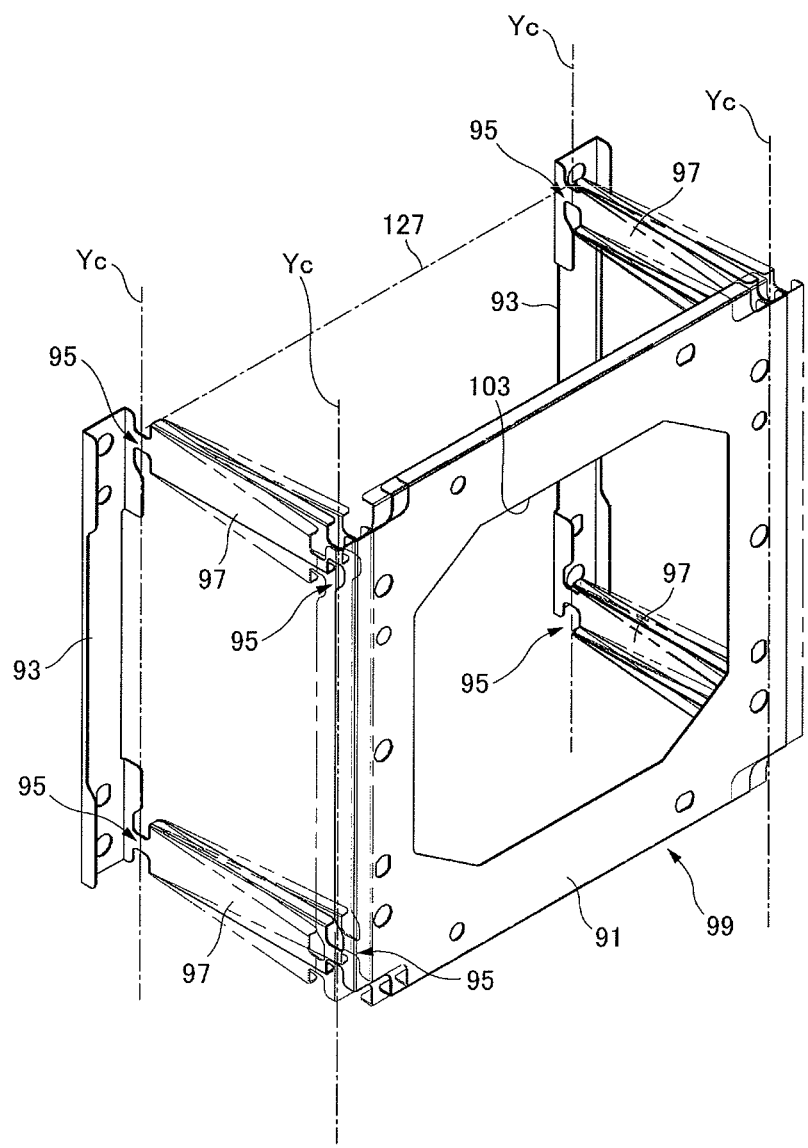
FIG. 12 is an operation explanatory diagram when a leaf spring of the initial-stage vibration member is diagonally viewed in the upper right from the rear side.

FIG. 12 is an operation explanatory diagram when leaf spring 99 of initial-stage vibration member 63 is diagonally viewed in the upper right from the rear side.

An example in which leaf spring 99 of initial-stage vibration member 63 is used will be described in FIG. 12, the following description may be similarly applied to leaf spring 119 of next-stage vibration member 65.

In shake correction mechanism 100 of the configuration example according to the present exemplary embodiment, a vibration mechanism that causes opposite sides of parallelogram 127 to move in a substantially parallel manner by using corners of leg pillar plates 97 as hinges of flexible parts 95 is provided. Such a vibration mechanism is layered in two stages, and the next stage capable of moving in a direction perpendicular to the movement direction of the initial stage is provided. That is, next-stage vibration member 65 is fixed to initial-stage vibration member 63 fixed to camera housing 25. In such a two-stage structure, imaging element 73 mounted on coupler 113 of next-stage vibration member 65 is able to freely move in two axis directions in substantially parallel with camera housing 25.

Imaging element 73 is able to freely move in two axis directions perpendicular to optical axis Oc of lens unit 27 by disposing lens unit 27 in camera housing 25 and disposing imaging element 73 at coupler 113 of next-stage vibration member 65. Thus, when surveillance camera 200A or surveillance camera 200 is shaken by external force, surveillance camera 200A or surveillance camera 200 can suppress the degradation (image blur) in the quality of the captured image caused by the shake and can acquire a favorable image by moving imaging element 73 through coupler 113 of next-stage vibration member 65 in a direction in which the shake is canceled due to the use of actuator 87.

In this case, surveillance camera 200A or surveillance camera 200 may use, as actuator 87, first linear motor 83 constituted by first coil 75 and first magnet 79 and second linear motor 85 constituted by second coil 77 and second magnet 81. First linear motor 83 and second linear motor 85 are in non-contact with each other.

In shake correction mechanism 100, a position of imaging element 73 is shifted along optical axis Oc due to the bending of flexible parts 95. However, the shift amount falls within the depth of focus (that is, a range in which the subject is sharply in focus even though a distance between the object lens and imaging element 73 is changed from a position to be in focus) of the lens (not shown) disposed within lens unit 27 or 35, it is considered that there is no influence to the extent that the quality of the captured image is degraded.

Since initial-stage vibration member 63 and next-stage vibration member 65 have the gate shape in which the leg base ends of the pair of legs 69 (legs 111) are connected by coupler 91 (coupler 113) as a beam, imaging element 73 is able to be more stably supported than in a case where these vibration members have an L-shaped structure. In addition, since shake correction mechanism 100 has the gate shape, the shake correction mechanism has high holding strength and has high durability. Thus, for example, shake correction mechanism 100 of the configuration example according to the present exemplary embodiment can contribute to durability that sufficiently satisfies five years corresponding to an optical device and a photo production device in a service life table indicating a legal period of use in service of a device.

Since initial-stage vibration member 63 and next-stage vibration member 65 use flexible parts 95 as vibration parts, there is no increase in starting torque due to the friction as in the sliding mechanism for sliding the ball of the related art by rolling the ball or a sliding bearing. Accordingly, hysteresis caused by the increase in the starting torque does not occur. Thus, it is possible to reduce driving energy. Backlash does not occur as in a gear mechanism. Accordingly, it is easy to apply an appropriate load, and it is possible to smoothly perform accurate minute movement control. That is, shake correction mechanism 100 can smooth operation control.

Since shake correction mechanism 100 uses flexible parts 95 as the vibration parts of initial-stage vibration member 63 and next-stage vibration member 65, it is not necessary to combine a plurality of members with a complicated structure, and the structure is simplified. Thus, it is possible to reduce cost, and it is possible to reduce the weight of the device.

Shake correction mechanism 100 can be manufactured in large quantities at low cost with high accuracy by punching, drilling, and bending the main parts of initial-stage vibration member 63 or next-stage vibration member 65 through press processing. Since the shape of flexible part 95 is also able to be formed with high accuracy, it is possible to acquire hinge characteristics with no variations. Since the basic structure of initial-stage vibration member 63 or next-stage vibration member 65 is one component made of one different plate material (for example, leaf spring), it is possible to further reduce the number of components than in the gear mechanism or a link mechanism using a surrounding kinematic pair.

In shake correction mechanism 100, initial-stage vibration member 63 and next-stage vibration member 65 have a nested structure in which next-stage vibration member 65 is disposed inside initial-stage vibration member 63. Initial-stage vibration member 63 covers next-stage vibration member 65. Thus, interference with another member is less likely to occur, and the vibration mechanism in two axis directions may be intensively provided in a compact space. The vibration mechanism of the configuration example according to the present exemplary embodiment has the nested structure, and thus, the size of the vibration mechanism can be further reduced than in a configuration in which separate vibration mechanisms are distributed in two axis directions.

For example, in shake correction mechanism 100, coupler 91, the pair of legs 69 connected to coupler 91, and leg end fixers 93 connected to the pair of legs 69 are punched as one molding material in initial-stage vibration member 63. As for Leg 69, a part positioned between vibration center Yc between leg end fixer 93 and leg 69 and vibration center Yc between leg 69 and coupler 91 has a quadrangular outer shape. This quadrangular shape is formed by bending a boundary between leg end fixer 93 and leg 69 and a boundary between leg 69 and coupler 91 along a parallel bending line. An inner space of the quadrangular shape of leg 69 is drilled such that a quadrangular hole is formed. The drilling and punching of one molding material may be simultaneously performed. As a result, the pair of parallel leg pillar plates 97 that connects leg end fixers 93 and coupler 91 is formed as a remaining part in which the drilling is not performed in legs 69. Accordingly, initial-stage vibration member 63 and next-stage vibration member 65 are connected to leg end fixers 93 by the pair of parallel leg pillar plates 97 bent on both sides of coupler 91 at a right angle, and have the gate shape. The same is true for next-stage vibration member 65.

For example, in shake correction mechanism 100, binding parts 125 are formed at the left front ends and the leg base ends of leg pillar plates 97 that connect leg end fixers 93 and coupler 91 in initial-stage vibration member 63. Binding parts 125 are formed so as to be narrower than the plate width (so as to be smaller than a sectional area) of the portion of another leg pillar plate 97, and are parts having low rigidity. The plate width of binding part 125 is set to be greater than a plate thickness. Thus, binding parts 125 is likely to be bent by being elastically deformed around vibration center Yc in a plate width direction. Eight binding parts 125 are formed in each of initial-stage vibration member 63 and next-stage vibration member 65, and a total of 16 binding parts are present. Accordingly, initial-stage vibration member 63 and next-stage vibration member 65 that move in two axis directions distribute the load of the movable parts by a total of 16 binding parts 125, and suppress the concentration of the load. As a result, it is possible to reduce metal fatigue, and it is possible to increase durability. The same is true for next-stage vibration member 65.

For example, in shake correction mechanism 100, the pair of parallel leg pillar plates 97 formed on legs 69 is reinforced by U-shaped reinforcement plate 101 except for flexible parts 95 in initial-stage vibration member 63. Legs 69 constituted by only the pair of leg pillar plates 97 have rigidity of a quadrangular face bar by being reinforced by reinforcement plate 101. Accordingly, in initial-stage vibration member 63 and next-stage vibration member 65, the deformation of legs 69 other than vibration center Yc between leg end fixer 93 and leg 69 and vibration center Yc between leg 69 and coupler 91 is suppressed. Therefore, in initial-stage vibration member 63 and next-stage vibration member 65, the twisting of legs 69 is less likely to occur, and it is possible to realize higher-accurate vibration operation in two axis directions. The same is true for next-stage vibration member 65.

According to the camera device, shake correction mechanism 100 is provided, and thus, imaging element 73 can freely move with respect to camera housing 25 in two directions perpendicular to optical axis Oc. Thus, it is possible to suppress image blur. Since the main parts of shake correction mechanism 100 are constituted by layering initial-stage vibration member 63 and next-stage vibration member 65 which have the gate shape in two stages, the holding strength of imaging element 73 is high, and thus, it is possible to stably support imaging element 73.

Therefore, in accordance with shake correction mechanism 100 according to the exemplary embodiment, it is possible to smoothly realize an operation in two axis directions while securing durability with a simple structure.

In accordance with surveillance camera 200 and surveillance camera 200A according to the present exemplary embodiment, it is possible to maintain a favorable image over a long period of time even though a place in which the camera is provided largely shakes.

(Background of Contents of Exemplary Embodiment 2)

In the configuration of Japanese Patent Unexamined Publication No. 2014-45304, there is no consideration on countermeasures when a movement range of the imaging element unit exceeds an effective imaging range of an optical lens as the image stabilization function of the electronic device such as the mobile phone having the camera module mounted thereon.

For example, when it is assumed that the electronic device of Japanese Patent Unexamined Publication No. 2014-45304 is provided in the place in which the device shakes and the electronic device shakes to the extent that the movement range of the imaging element unit exceeds the effective imaging range of the optical lens, light may not be incident on at least a part of the light reception surface (imaging surface) of the imaging element. In this case, vignetting occurs on the captured image in a portion of the light reception surface on which the light is not incident, the quality of the captured image is degraded, and reliability as the data of the captured image is degraded. When the movement range of the imaging element unit is controlled so as to be minimized in order to suppress the occurrence of the vignetting, an effect of the image stabilization is less likely to be exhibited. Thus, an optical lens of which an effective imaging range is large needs to be selected, and it is difficult to avoid an increase in cost.

Thus, in Exemplary Embodiment 2 to be stated below, examples of a camera device and a shake correction method which effectively suppresses degradation in quality of a captured image captured by an imaging element and prevents reliability as the data of the captured image from being degraded with a simple configuration even when a device main body is provided in a place in which the device shakes will be described.

Exemplary Embodiment 2

Figure 13:
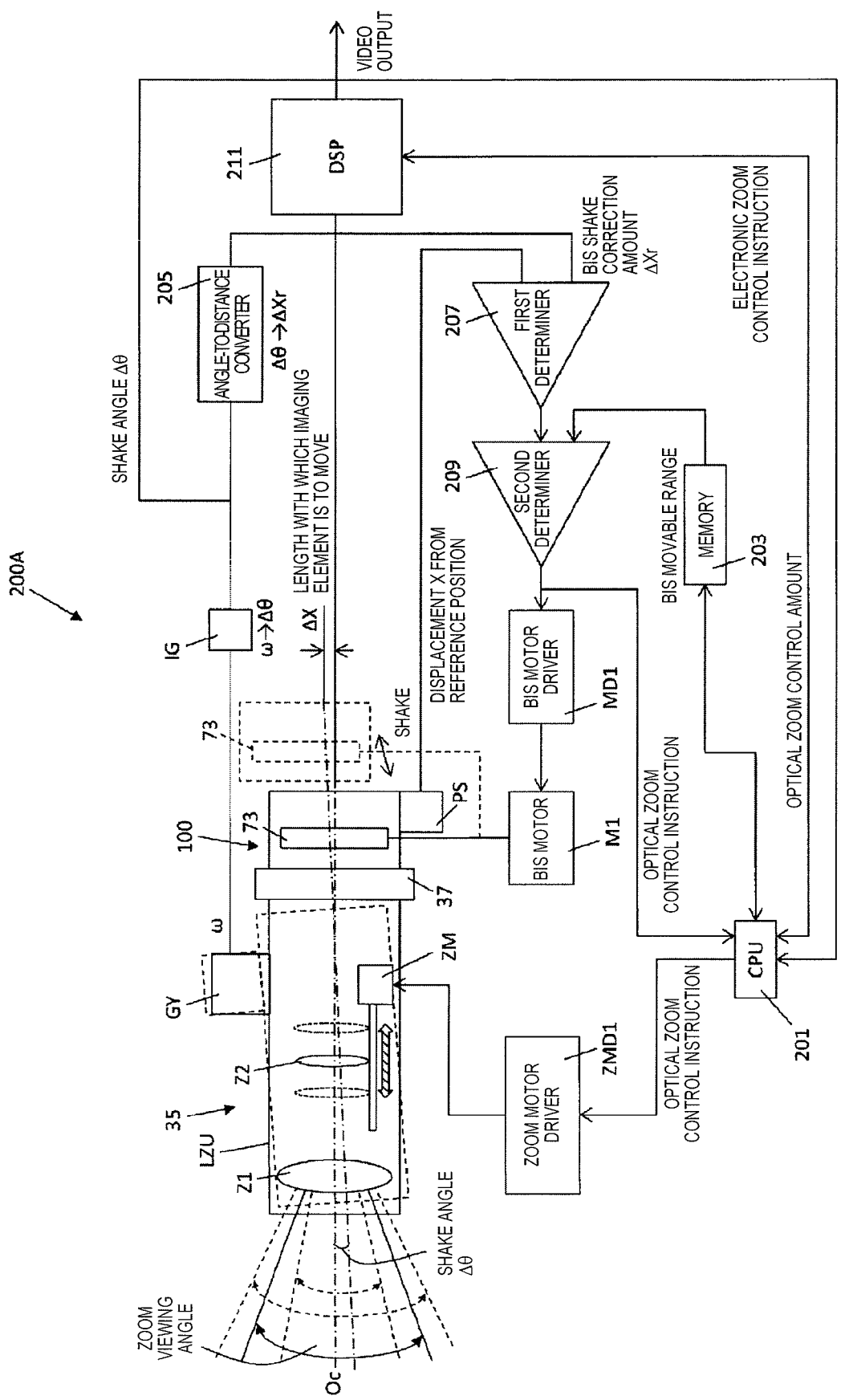
FIG. 13 is a block diagram showing an example of an internal configuration of a surveillance camera according to Exemplary Embodiment 2 in detail.

FIG. 13 is a block diagram showing an example of an internal configuration of surveillance camera 200A according to Exemplary Embodiment 2 in detail.

Surveillance camera 200A according to the present exemplary embodiment is illustrated as an example of the camera device including shake correction mechanism 100 of Exemplary Embodiment 1. That is, surveillance camera 200A according to the present exemplary embodiment is fixed to a fixing target surface and is provided in a place in which shaking occurs on the fixing target surface. In the following Exemplary Embodiments 2 and 3, parts having the same configuration as the parts described in shake correction mechanism 100 according to Exemplary Embodiment 1 will be assigned the same references. Accordingly, the description thereof will be simplified or omitted, and thus, different contents will be described.

Surveillance camera 200A shown in FIG. 13 includes lens unit 35 to which lens mount base 37 is attached, shake correction mechanism 100 to which imaging element 73 is attached, position sensor PS, gyro sensor GY, integrator IG, CPU 201, memory 203, angle-to-distance converter 205, first determiner 207, second determiner 209, DSP 211, BIS motor driver MD1, BIS motor M1, and zoom motor driver ZMD1.

Lens unit 35 includes lens unit LZU which includes various lenses for constituting an imaging optical system of surveillance camera 200A and zoom motor ZM capable of driving some lenses (for examples, zoom lens Z2) in a horizontal direction (see a hatched arrow) to optical axis Oc, and lens mount base 37. As described in Exemplary Embodiment 1, shake correction mechanism 100 is fixed to lens mount base 37.

Lens unit LZU includes at least fixed zoom lens Z1 as an example of an object lens and movable zoom lens Z2 positioned at a later stage of zoom lens Z1. In the following Exemplary Embodiments 2 and 3, other zoom lenses other than two-stage zoom lens may be provided in lens unit LZU. Subject light rays (that is, light rays reflected by the subject) are incident on zoom lenses Z1 and Z2. The subject light rays incident on zoom lenses Z1 and Z2 are formed as an image in a region within effective image circle CR1 (see FIG. 14). For simplicity of illustration, the focus lens is not illustrated in surveillance camera 200A (see FIG. 13) corresponding to Exemplary Embodiment 2 and surveillance camera 200AA (see FIG. 19) corresponding to Exemplary Embodiment 3.

Zoom motor ZM drives zoom lens Z2 in a horizontal direction (in other words, a forward direction and a backward direction to and from the direction of optical axis Oc) to the direction of optical axis Oc according to a control signal output from zoom motor driver ZMD1 based on an optical zoom control instruction of CPU 201. That is, lens unit LZU is able to change an optical zoom magnification as an example of a zoom magnification of zoom lens Z2. Accordingly, CPU 201 is able to change a zoom viewing angle of the imaging optical system of surveillance camera 200A, and is able to change the optical zoom magnification. For example, CPU 201 optically zooms in (narrows the viewing angle of) or zooms out (widens the viewing angle of) a captured image captured by imaging element 73 by driving zoom lens Z2 in the horizontal direction to the direction of optical axis Oc.

The detailed configuration of shake correction mechanism 100 is described in Exemplary Embodiment 1, and thus, the detailed description will be omitted. Shake correction mechanism 100 holds element holder 67 as an example of a holder for holding imaging element 73, and performs shake correction on the captured image captured by imaging element 73 through the driving of element holder 67 based on a detection value of gyro sensor GY. Position sensor PS is attached to shake correction mechanism 100.

Position sensor PS detects displacement amount X from a reference position (for example, a position of imaging element 73 when optical axis Oc passes through a center of light reception surface RVL1 of imaging element 73) of imaging element 73. When imaging element 73 is not displaced (that is, is not shifted) from the reference position, an output of position sensor PS is zero (0). Position sensor PS outputs information regarding displacement amount X from the reference position of imaging element 73 to first determiner 207.

Imaging element 73 images an image based on light rays (that is, subject light rays) incident on lens unit 35. That is, imaging element 73 causes the subject light rays reflected by the subject to be incident on light reception surface RVL1 (see FIG. 14) within effective image circle CR1 and converts an optical image based on the incident subject light rays into electrical signals (performs photoelectric conversion). Imaging element 73 outputs the electrical signals acquired through the photoelectric conversion) to a signal processor (not shown).

For example, the signal processor is disposed on board 89 of element holder 67 on which imaging element 73 is disposed. The signal processor generates image signals (for example, image signals in RGB format or YUV format) for each frame by performing predetermined signal processing on the electrical signals output from imaging element 73, and outputs the generated image signals to DSP 211. Hereinafter, the image signals input to DSP 211 are referred to as "captured images" for the sake of convenience in description. The captured images may be still images or moving images. A frame rate is, for example, 60 frames per second (fps). For example, imaging element 73 is constituted by a charge coupled device (CCD) or a complementary metal oxide semiconductor (CMOS).

Gyro sensor GY as an example of a shake sensor detects the shake of surveillance camera 200A, and outputs the detected shake to integrator IG. For example, gyro sensor GY is attached so as to be fixed to a housing of lens unit LZU of lens unit 35. Gyro sensor GY detects angular velocity ω based on rotation (for example, shake angle Δθ) of lens unit LZU caused by the shake of surveillance camera 200A, as an example of a parameter indicating the shake of surveillance camera 200A (for example, lens unit LZU). Information regarding angular velocity ω detected by gyro sensor GY is input to integrator IG. In the following Exemplary Embodiments 2 and 3, gyro sensor GY may be attached to lens mount base 37.

Integrator IG calculates shake angle Δθ as an example of the parameter indicating the rotation of lens unit LZU caused by the shake of surveillance camera 200A by performing integration on angular velocity ω detected by gyro sensor GY with time, and outputs the calculated shake angle to CPU 201 and angle-to-distance converter 205.

CPU 201 as an example of the processor performs various processing or control related to the operation of surveillance camera 200A in cooperation with memory 203. For example, CPU 201 instructs zoom motor driver ZMD1 to perform optical zoom control for zoom lens Z2 or instructs DSP 211 to perform electronic zoom control on the captured image captured by imaging element 73 by referring to a program and data retained in memory 203 and executing the program. For example, the details of the process of CPU 201 will be described below by referring to FIGS. 15 and 18.

CPU 201 calculates a different in-body image stabilizer (BIS) movable range for each optical zoom magnification of the zoom lens within lens unit LZU by referring to information regarding various lenses within lens unit LZU and information regarding imaging element 73 which are stored in advance in memory 203, and sets the calculated BIS movable range in memory 203. The information regarding the BIS movable range is referred to by second determiner 209. The BIS movable range indicates a movement range allowed for imaging element 73 so as not to cause vignetting (for example, crushed shadows) on the captured image captured by imaging element 73. The BIS movable range is different for each optical zoom magnification of the zoom lens (see FIG. 17B).

The details of the BIS movable range will be described with reference to FIG. 14.

Figure 14:
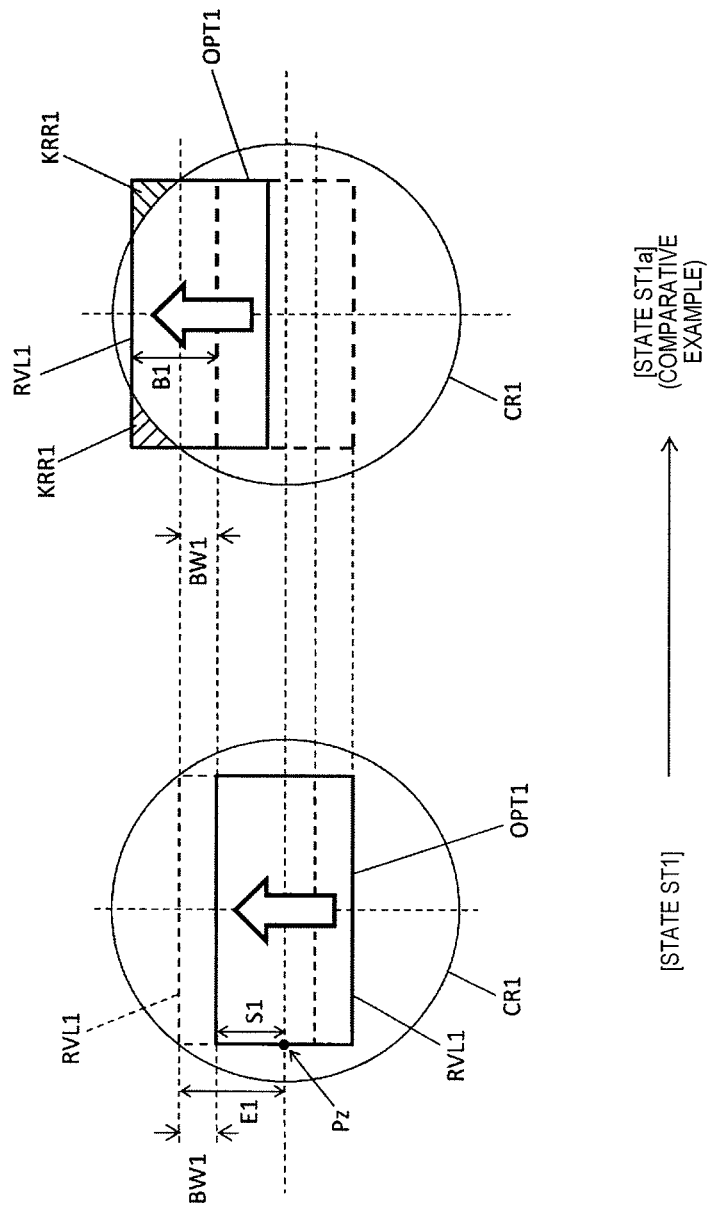
FIG. 14 is an explanatory diagram showing a BIS movable range corresponding to an optical zoom magnification and degradation in quality of a captured image when a light reception surface moves beyond the BIS movable range.

FIG. 14 is an explanatory diagram showing the BIS movable range corresponding to the optical zoom magnification and degradation in quality of the captured image when the light reception surface moves beyond the BIS movable range.

In state ST1 (left side on the paper) of FIG. 14, BIS movable range BW1 being in a state (for example, a state before surveillance camera 200A shakes) in which surveillance camera 200A does not shake is illustrated. Meanwhile, in state ST1a (right side on the paper) of FIG. 14 as a comparative example, an example in which the quality of the captured image is degraded when imaging element 73 moves beyond BIS movable range BW1 by shake correction mechanism 100 (that is, light reception surface RVL1 moves) in a state in which surveillance camera 200A shakes is illustrated. In state ST1, the size of light reception surface RVL1 of imaging element 73 corresponds to a size (monitor output size OPT1) output to a monitor (not shown) on which the captured image of surveillance camera 200A is displayed.

BIS movable range BW1 is determined by a difference between length E1 of effective image circle CR1 using left end Pz which is an end of a region of monitor output size OPT1 (in other words, cut size) of imaging element 73 corresponding to a certain zoom position (that is, a position within lens unit LZU of movable zoom lens Z2) as its reference and length S1 of the region of monitor output size OPT1 (in other words, cut size) of imaging element 73 at left end Pz which is the end of the region of monitor output size OPT1 of imaging element 73 corresponding to the certain zoom position. Although it has been described in FIGS. 14 and 15 that left end Pz of the region of the monitor output size is used an example, the end of monitor output size OPT1 is not limited to left end Pz, and may be a right end. The same applies in later occurrences. The monitor output size is a size indicating a range in which the light reception surface is electronically cut and is used as the captured image. CPU 201 may calculate BIS movable range BW1 for each zoom position, and may set and store the calculated BIS movable range in memory 203.

It is assumed that imaging element 73 moves beyond BIS movable range BW1 by movement amount B1 by shake correction mechanism 100 in the same zoom position (that is, a position within lens unit LZU of zoom lens Z2) as that in state ST1 along with the shake of surveillance camera 200A. In this case, light reception surface RVL1 further moves beyond BIS movable range BW1 than that in state ST1, as represented in state ST1a of FIG. 14. Accordingly, since a part of light reception surface RVL1 protrudes from effective image circle CR1, the subject light rays are not incident on light reception surface KRR1 of the protruding part. Thus, vignetting (for example, crushed shadows) occurs, the quality of the captured image captured by imaging element 73 is degraded. Movement amount B1 shown in FIG. 14 is a value with a dimension acquired by converting the output of gyro sensor GY into shake angle Δθ by integrator IG and converting shake angle Δθ into a length by angle-to-distance converter 205.

Accordingly, when imaging element 73 moves such that movement amount B1 of imaging element 73 is within BIS movable range BW1 by shake correction mechanism 100 along with the shake of surveillance camera 200, vignetting occurs on the captured image, and the quality of the captured image is not degraded. For example, when imaging element 73 moves such that movement amount B1 of imaging element 73 exceeds BIS movable range BW1 by shake correction mechanism 100 along with the shake of surveillance camera 200, vignetting occurs on at least a part of the captured image, and the quality of the captured image is degraded.

For example, memory 203 is a flash memory or is a hard disk, and stores a program or data required by CPU 201 which executes processing or control related to the operation of surveillance camera 200A. Memory 203 stores information regarding various lenses within lens unit LZU or information regarding imaging element 73. Memory 203 operates as a random access memory (RAM) having a function of a work memory when the units of surveillance camera 200A execute processing.

Memory 203 retains a table acquired by associating zoom positions (that is, positions within lens unit LZU of movable zoom lens Z2) with optical zoom magnifications corresponding to the zoom positions (see FIG. 17A). Memory 203 retains a table of a different BIS movable range for each zoom magnification calculated by CPU 201 (see FIG. 17B).

FIG. 17A is a table showing an example of a correspondence between the zoom positions and the optical zoom magnifications.

In the table shown in FIG. 17A, the zoom positions (that is, the positions within lens unit LZU of movable zoom lens Z2) and the optical zoom magnifications corresponding to the zoom positions are associated with each other. Since the zoom position is prepared for each step size of zoom motor ZM (for example, stepping motor) for driving zoom lens Z2, the optical zoom magnifications are able to be gradually changed as discrete values (see FIG. 17A).

FIG. 17B is a table showing an example of a correspondence between the optical zoom magnifications and the BIS movable ranges.

In the table shown in FIG. 17B, the optical zoom magnifications determined based on the zoom positions (see above) and the BIS movable ranges indicating allowable movement amounts of imaging element 73 in the shake correction of shake correction mechanism 100 are associated with each other. Values of the BIS movable ranges are values which are calculated by CPU 201 according to the optical zoom magnifications and are set in memory 203.

Angle-to-distance converter 205 retains information regarding a focal length of the imaging optical system of surveillance camera 200A determined by various lenses within lens unit LZU in advance, but acquires the information regarding the focal length by reading the information regarding the focal length from memory 203. In order to prevent the drawing of FIG. 13 from being complicated, an arrow between angle-to-distance converter 205 and memory 203 is not illustrated. Angle-to-distance converter 205 acquires information regarding shake angle Δθ output from integrator IG, and converts shake angle Δθ into a length (in other words, indicates a length with which imaging element 73 is to move, and hereinafter, referred to as a "BIS shake correction amount") on which the shake correction is to be performed by shake correction mechanism 100 so as to correspond to shake angle Δθ by using information regarding focal length f and the shake angle Δθ. That is, when shake angle Δθ is detected along with the shake of surveillance camera 200A, angle-to-distance converter 205 may calculate a driving amount for driving imaging element 73 toward a side opposite to a direction in which surveillance camera 200A shakes, as a BIS shake correction amount, in order to cancel the influence of the shake of shake angle Δθ.

Figure 20:
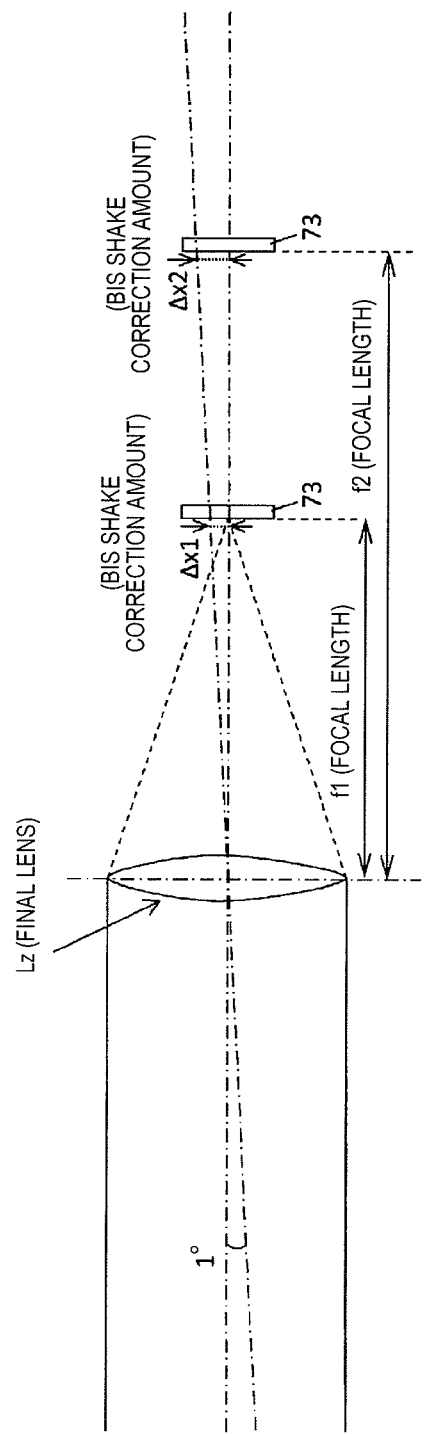
FIG. 20 is an explanatory diagram showing that a BIS shake displacement amount to be corrected is different according to a difference between focal lengths.

For example, angle-to-distance converter 205 calculates BIS shake correction amount ΔXr as represented by Expression (1) by using the information regarding focal length f and shake angle Δθ (see FIG. 20), and outputs the calculation result to first determiner 207. In FIG. 20, shake angle Δθ corresponds to 1 degree, focal length f corresponds to focal length f1, and BIS shake correction amount ΔXr corresponds to Δx1.

[Expression 1]

$$\Delta Xr = f \times \tan(\Delta\theta) \quad (1)$$

For example, first determiner 207 acquires the information regarding displacement amount X output from position sensor PS and information regarding BIS shake correction amount ΔXr output from angle-to-distance converter 205, calculates a difference (ΔXr−X) between BIS shake correction amount ΔXr and displacement X, and outputs the calculation result, as BIS shake correction amount of shake correction mechanism 100, to second determiner 209.

It is considered that the calculation process of first determiner 207 has the following technical significance. Specifically, BIS shake correction amount ΔXr is a value calculated along with the shake (rotation) of lens unit LZU, and the movement amount of imaging element 73 along with the shake (rotation) of lens unit LZU is offset (that is, added). Accordingly, first determiner 207 is able to calculate accurate BIS shake correction amount (that is, length with which imaging element 73 is to move) of imaging element 73 according to the shake (in other words, the shake of lens unit LZU) of surveillance camera 200A by performing a process of subtracting as much as an offset amount (that is, displacement amount X).

When displacement amount X is equal to or less than a predetermined value which is stored in memory 203 or is retained in advance by first determiner 207 itself, first determiner 207 may omit the process of subtracting displacement amount X described above, and may output the information regarding BIS shake correction amount ΔXr output from angle-to-distance converter 205 to second determiner 209 without change.

Second determiner 209 acquires the information regarding the BIS shake correction amount output from first determiner 207 and the information regarding the BIS movable range corresponding to the optical zoom magnification acquired from memory 203. Second determiner 209 compares the information regarding the BIS shake correction amount output from first determiner 207 and the information regarding the BIS movable range corresponding to the optical zoom magnification acquired from memory 203. In other words, second determiner 209 determines whether or not vignetting occurs on the captured image captured by imaging element 73.

Specifically, when it is determined that the BIS shake correction amount is equal to or less than the BIS movable range, second determiner 209 determines that the vignetting does not occur on the captured image captured by imaging element 73. The second determiner generates a control signal of the shake correction using the information regarding the BIS shake correction amount, and outputs the generated control signal to BIS motor driver MD1.

When it is determined that the BIS shake correction amount exceeds the BIS movable range, second determiner 209 determines that the vignetting occurs on the captured image captured by imaging element 73 or there is a possibility that the vignetting will occur on the captured image. The second determiner outputs an instruction to change a current optical zoom magnification (specifically, to decrease the optical zoom magnification) to CPU 201. When the instruction from second determiner 209 is received, CPU 201 generates a control signal for changing the optical zoom magnification such that the current optical zoom is decreased, and outputs the generated control signal to zoom motor driver ZMD1. The information regarding the current optical zoom magnification is retained in CPU 201 or is temporarily retained in a random access memory (RAM) within memory 203.

Digital signal processor (DSP) 211 as an example of the processor acquires the captured image output from the signal processor (not shown), generates video data based on the captured image by performing predetermined processing, and outputs the video data to a later stage (not shown and, for example, a communicator which communicates with an external device connected to surveillance camera 200A). The signal processor (not shown) may be omitted. In this case, the electrical signals output from imaging element 73 are directly input to DSP 211, and the captured image which is the image signal (for example, image signal in RGB format or YUV format) for each frame by DSP 211 which performs predetermined signal processing.

DSP 211 may estimate a change rate from the current optical zoom magnification or a minimum optical zoom magnification indicating an optical zoom-out amount at which the occurrence of vignetting is able to be avoided by analyzing data of the captured image based on the data of the captured image acquired from the signal processor (not shown) or the captured image generated in the DSP and the information regarding the current optical zoom magnification. DSP 211 outputs the estimation result (that is, the minimum optical zoom magnification or the change rate from the current optical zoom magnification) to CPU 201.

Figure 15:
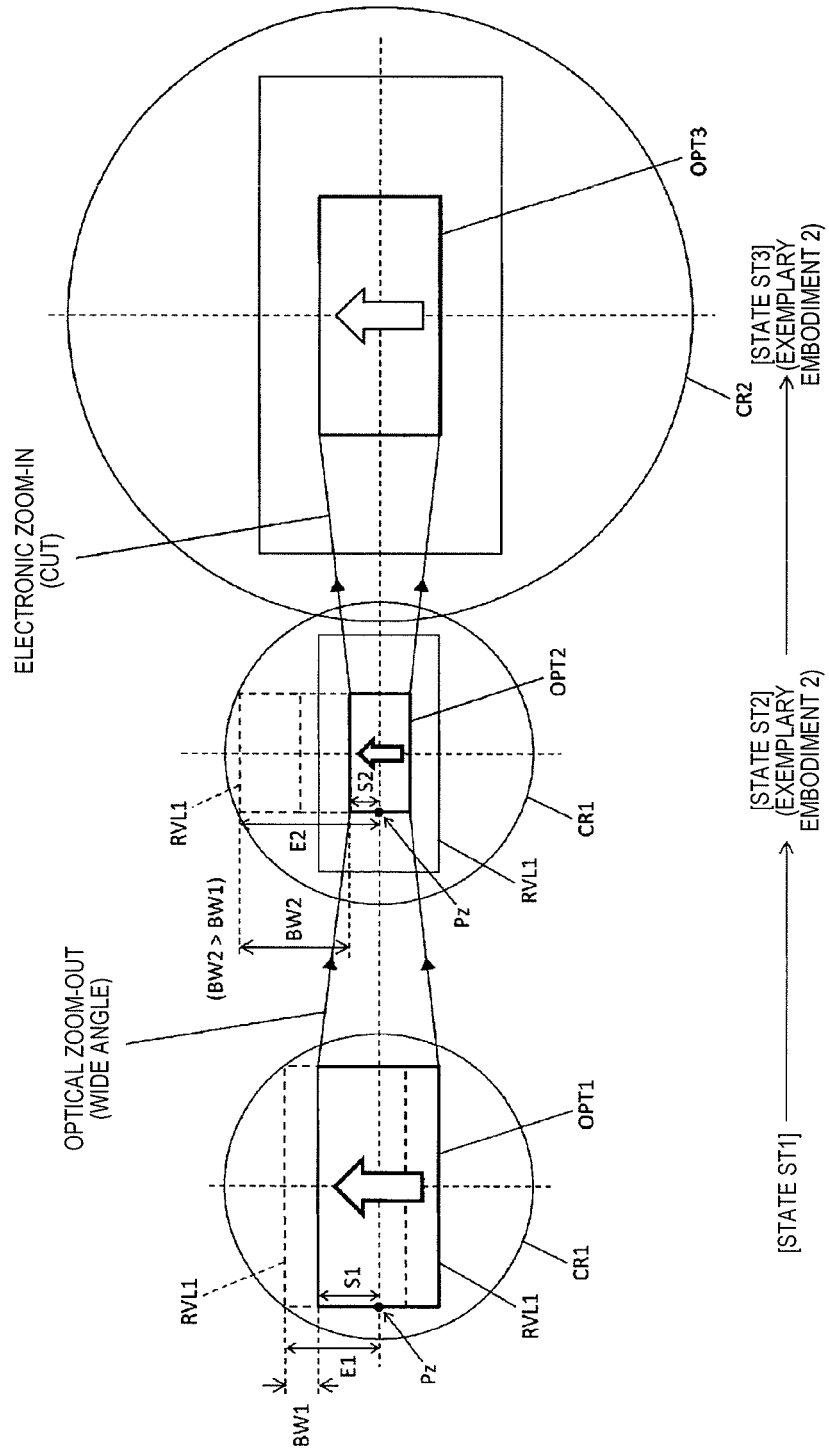
FIG. 15 is an explanatory diagram showing an example of an operation outline of a surveillance camera according to Exemplary Embodiment 2.

DSP 211 generates a captured image in which the influence of the shake of surveillance camera 200A is canceled or is relaxed without changing a size of a video on a monitor output screen being in a state before the optical zoom control (for example, optical zoom-out) by performing a process of cutting an electronic pixel pitch on a captured image after the optical zoom control (for example, optical zoom-out) is executed in zoom motor driver ZMD1 based on a control signal of an electronic zoom control instruction from CPU 201 (see FIG. 15).

BIS motor driver MD1 generates a control signal for activating BIS motor M1 based on the control signal output from second determiner 209, and outputs the generated control signal to BIS motor M1. BIS motor driver MD1 causes shake correction mechanism 100 to execute the shake correction of the BIS shake correction amount determined in second determiner 209 by controlling BIS motor M1 based on this control signal. That is, BIS motor driver MD1 moves element holder 67 that holds imaging element 73 in a direction opposite to the direction in which surveillance camera 200A shakes as much as the BIS shake correction amount by performing, for example, proportional integral differential (PID) control.

BIS motor M1 causes shake correction mechanism 100 to execute the shake correction of the BIS shake correction amount determined in second determiner 209 based on the control signal output from BIS motor driver MD1. Accordingly, when shake angle Δθ is detected along with the shake of surveillance camera 200A, shake correction mechanism 100 including BIS motor driver MD1 and BIS motor M1 can cancel or relax the influence of the shake and can suppress the degradation in the quality of the captured image by moving imaging element 73 as much as the length of the BIS shake correction amount acquired according to shake angle Δθ. BIS motor M1 corresponds to actuator 87 including first linear motor 83 and second linear motor 85 of shake correction mechanism 100 according to Exemplary Embodiment 1, and the same is true for the following Exemplary Embodiment 3.

Zoom motor driver ZMD1 generates a control signal for activating zoom motor ZM based on the control signal of the optical zoom control instruction output from CPU 201, and outputs the generated control signal to zoom motor ZM. Zoom motor driver ZMD1 causes zoom motor ZM to set a changed optical zoom magnification determined in CPU 201 by controlling zoom motor ZM based on this control signal. That is, for example, zoom motor driver ZMD1 moves zoom lens Z2 in the horizontal direction to the direction of optical axis Oc so as to acquire an optical zoom magnification smaller than the current optical zoom magnification (see FIG. 15).

For example, CPU 201 determines a change rate (that is, a decrease width of the optical zoom magnification at which the vignetting does not occur on the captured image) when the current optical zoom magnification decreases according to the following several methods, and controls the activation of zoom motor driver ZMD1 so as to acquire a determined optical zoom magnification (that is, a new optical zoom magnification after the optical zoom-out).

<First Optical Zoom Magnification Determination Method>

For example, CPU 201 accumulates change rate information (not shown) acquired by associating information of shake angle $\Delta\theta$ with a change rate of the optical zoom magnification for each detection time of gyro sensor GY for a predetermined period of time in memory 203. For example, the predetermined period of time is one day, one week, one month, or one year, and is not limited to these periods of time. CPU 201 determines a maximum value of the change rates (that is, decrease widths of the optical zoom magnification) of the optical zoom magnification for the predetermined period of time by using the change rate information accumulated in memory 203, as a decrease rate of the optical zoom magnification. Accordingly, for example, CPU 201 can acquire a wide BIS movable range after the optical zoom-out and can suppress the degradation in the quality of the captured image through the shake correction in shake correction mechanism 100 by using the maximum value of the decrease width of the optical zoom magnification when surveillance camera 200A largely shakes.

<Second Optical Zoom Magnification Determination Method>

For example, CPU 201 accumulates change rate information (not shown) acquired by associating information of shake angle $\Delta\theta$ with a change rate of the optical zoom magnification for each detection time of gyro sensor GY for a predetermined period of time in memory 203. For example, the predetermined period of time is one day, one week, one month, or one year, and is not limited to these periods of time. CPU 201 determines an average value of the change rates (that is, the decrease widths of the optical zoom magnification) of the optical zoom magnification for the predetermined period of time by using the change rate information accumulated in memory 203, as the decrease rate of the optical zoom magnification. Accordingly, for example, CPU 201 can stably acquire the BIS movable range in which a variation is slight after the optical zoom-out and can suppress the degradation in the quality of the captured image through the shake correction in shake correction mechanism 100 by using an average value of the decrease widths of the optical zoom magnification when surveillance camera 200A normally shakes.

<Third Optical Zoom Magnification Determination Method>

For example, CPU 201 accumulates change rate information (not shown) acquired by associating information of shake angle $\Delta\theta$ with a change rate of the optical zoom magnification for each detection time of gyro sensor GY for a predetermined period of time in memory 203. For example, the predetermined period of time is one day, one week, one month, or one year, and is not limited to these periods of time. CPU 201 determines a decrease rate of an optical zoom magnification matching a current time according to a temporal change (for example, time dependency or seasonal dependency) of the change rate (that is, the decrease width of the optical zoom magnification) of the optical zoom magnification which is included in the change rate information accumulated in memory 203. Accordingly, for example, when the shake of surveillance camera 200A has specific time dependency or seasonal dependency, CPU 201 can stably acquire the BIS movable range after the optical zoom-out suitable for the time dependency or seasonal dependency, and can suppress the degradation in the quality of the captured image through the shake correction in shake correction mechanism 100.

Figure 16A:
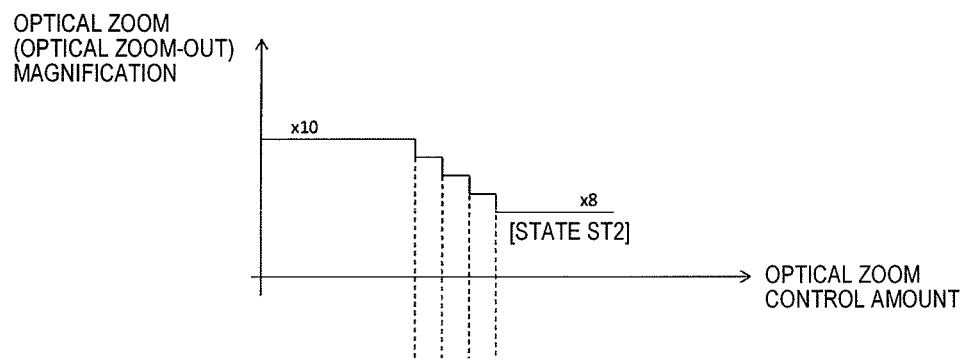
FIG. 16A is a graph for showing an example of the relationship between an optical zoom control amount and an optical zoom magnification according to Exemplary Embodiment 2.
Figure 16B:
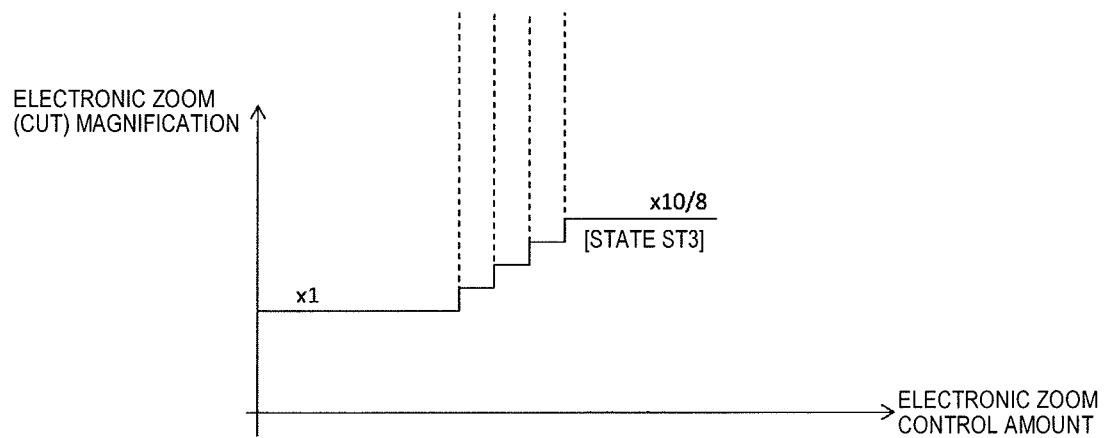
FIG. 16B is a graph for showing an example of the relationship between an electronic zoom control amount and an electronic zoom magnification according to Exemplary Embodiment 2.

FIG. 15 is an explanatory diagram showing an example of an operation outline of surveillance camera 200A according to Exemplary Embodiment 2. FIG. 16A is a graph for showing an example of the relationship between an optical zoom control amount and an optical zoom magnification according to Exemplary Embodiment 2. FIG. 16B is a graph for showing an example of the relationship between an electronic zoom control amount and an electronic zoom magnification according to Exemplary Embodiment 2.

State ST1 (leftmost side on the paper) of FIG. 15 is the same state as that of state ST1 (left side on the paper) of FIG. 14. State ST2 (center on the paper) of FIG. 15 shows that monitor output size OPT2 of imaging element 73 is smaller than monitor output size OPT1 of imaging element 73 in state ST1 after zoom motor driver ZMD1 is instructed that the optical zoom-out (that is, the wide angle of the captured image) is performed through the determination of CPU 201 in a state in which surveillance camera 200A shakes. State ST3 (rightmost on the paper) of FIG. 15 shows that monitor output size OPT3 of imaging element 73 is apparently the same as or is substantially the same as monitor output size OPT1 of imaging element 73 in state ST1 after DSP 211 is instructed that electronic zoom-in (that is, the narrow angle of the captured image) is performed through the determination of CPU 201 in a point of time of state ST2 in which surveillance camera 200A shakes.

FIG. 15 shows an example in which the direction in which surveillance camera 200A shakes is only one direction (for example, a vertical direction parallel to a gravity direction), but the description of FIG. 15 is similarly applicable to a case where the direction in which surveillance camera 200A shakes extends in two directions (for example, a vertical direction parallel to the gravity direction and a horizontal direction parallel to the vertical direction and the ground).

Similarly, in state ST1 of FIG. 15, when imaging element 73 moves by a movement amount which is equal to or less than BIS movable range BW1 by shake correction mechanism 100 along with the shake of surveillance camera 200A, since light reception surface RVL1 of imaging element 73 does not protrude from effective image circle CR1, the vignetting does not occur on the captured image captured by imaging element 73, and the quality of the captured image is not degraded. However, as described by referring to FIG. 14, there is sufficiently a possibility that imaging element 73 moves by a movement amount (for example, movement amount B1 shown in FIG. 14) which exceeds BIS movable range BW1 by shake correction mechanism 100 along with the shake of surveillance camera 200A.

In the present exemplary embodiment, when an instruction to change the current optical zoom magnification is received from second determiner 209, CPU 201 controls the activation of zoom motor driver ZMD1 so as to decrease the current optical zoom magnification (that is, so as to perform optical zoom-out).

Accordingly, as represented in state ST2, the size of light reception surface RVL1 of imaging element 73 in state ST1 is not changed. However, a region of monitor output size OPT2 is smaller than a region of monitor output size OPT1 in state ST1 through the optical zoom-out, and the wide angle of the captured image is achieved. That is, the subject light rays are incident on the entire region of light reception surface RVL1 of imaging element 73 in state ST2, but a range to be used as the captured image is only a portion of the region of monitor output size OPT2.

Accordingly, in state ST2, BIS movable range BW2 determines a difference between length E2 of effective image circle CR1 using left end Pz which is an end of the region of monitor output size OPT2 of imaging element 73 corresponding to the changed zoom position from the zoom position in state ST1 as its reference and length S2 of the region of monitor output size OPT2 of imaging element 73 in left end Pz which is the end of monitor output size OPT2 of imaging element 73 corresponding to the changed zoom position.

Accordingly, the BIS movable range is changed from BIS movable range BW1 to BIS movable range BW2 so as to be longer (BW2>BW1) by executing the optical zoom-out from state ST1. Thus, in state ST2, the BIS movable range of shake correction mechanism 100 becomes wide, a movement allowable length of imaging element 73 increases, and the occurrence frequency of vignetting is reduced.

CPU 201 can cause DSP 211 to acquire the captured image of the region of the same monitor output size OPT3 as the size of the region of the monitor output size being in state ST1 in state ST3 by causing DSP 211 to execute an electronic zoom-in process from state ST2.

A horizontal axis in FIG. 16A corresponds to an optical zoom control amount (in other words, a zoom position of zoom lens Z2), and a vertical axis in FIG. 16A depicts an optical zoom magnification. A horizontal axis in FIG. 16B corresponds to an electronic zoom control amount (in other words, a pixel pitch as a unit to be cut from the captured image), and a vertical axis in FIG. 16B depicts an electronic zoom magnification (so-called cut magnification).

As shown in FIGS. 16A and 16B, for example, CPU 201 ascertains that the optical zoom magnification in the current state (state ST1) is "×10" (that is, 10× magnification), and performs the optical zoom-out such that the optical zoom magnification is "×8" (that is, 8× magnification) by gradually changing the optical zoom magnification from "×10" (state ST2) when the instruction to change the current optical zoom magnification is received from second determiner 209.

Based on the change rate of the optical zoom-out so as to be synchronized (interconnected) with a timing when zoom motor driver ZMD1 is instructed that the execution control of the optical zoom-out is performed, CPU 201 instructs DSP 211 to enlarge the captured image of which the wide angle is achieved through the optical zoom-out so as to be returned to an original size and to perform execution control (that is, to change setting from "×1" magnification which is the current cut magnification to "×10/8" magnification) of the cut electronic zoom-in.

Accordingly, the CPU 201 can cause DSP 211 to acquire a captured image having resolution which is slightly degraded from the resolution of the captured image captured in state ST1 but is not apparently changed from the captured image captured in state ST1 with the eye of human, and can suppress the degradation of the captured image of the subject even though surveillance camera 200A shakes. Since the BIS movable range which is an upper limit of the BIS shake correction amount of shake correction mechanism 100 is able to be longer than the BIS movable range being in state ST1, CPU 201 can acquire the driving amount of imaging element 73 for canceling or relaxing the influence of the shake of surveillance camera 200A is larger than that in state ST1, and can secure a larger operation compensation amount (for example, "BIS movable range BW2 being in state ST2"—"BIS movable range BW1 being in state ST1") of the shake correction of shake correction mechanism 100.

Hereinafter, an operation procedure of CPU 201 of surveillance camera 200A will be described with reference to FIG. 18.

Figure 18:
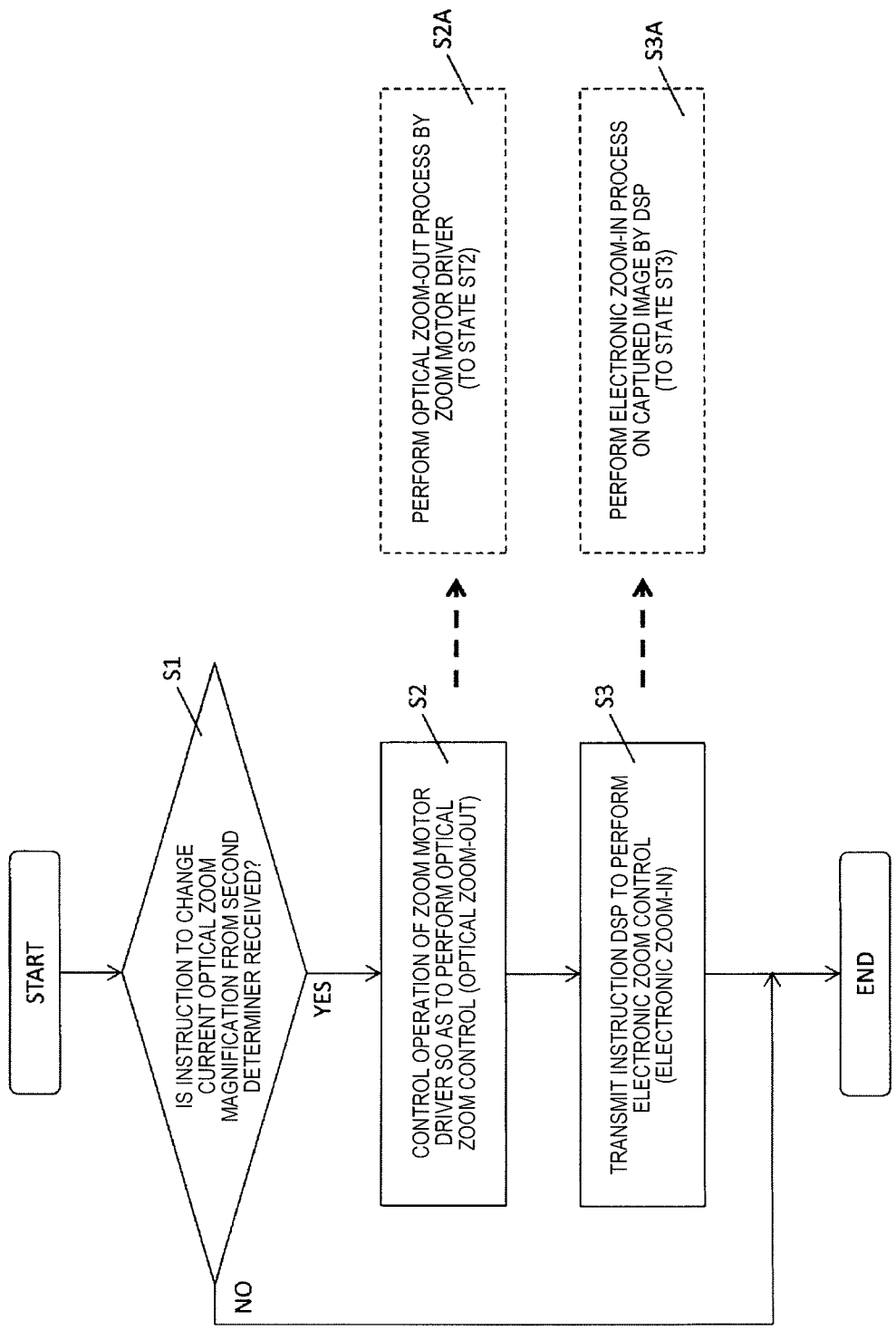
FIG. 18 is a flowchart showing an example of an operation procedure of a CPU of the surveillance camera according to Exemplary Embodiment 2 in detail.

FIG. 18 is a flowchart showing an example of the operation procedure of CPU 201 of surveillance camera 200A according to Exemplary Embodiment 2 in detail.

In FIG. 18, CPU 201 determines whether or not the instruction to change the current optical zoom magnification is received from second determiner 209 (S1). When it is determined that the instruction to change the current optical zoom magnification is not received from second determiner 209 (S1, NO), the process of CPU 201 shown in FIG. 18 is ended.

When it is determined that the instruction to change the current optical zoom magnification is received from second determiner 209 (S1, YES), CPU 201 controls the activation of zoom motor driver ZMD1 so as to decrease the current optical zoom magnification (that is, so as to perform the optical zoom-out) (S2). Zoom motor driver ZMD1 causes zoom motor ZM to change the position (zoom position) of zoom lens Z2 so as to gradually decrease the current optical zoom magnification, that is, to execute the optical zoom-out process according to an instruction from CPU 201 (S2A). Accordingly, for example, as represented in state ST2 of FIG. 15, the region of monitor output size OPT2 of the captured image captured by imaging element 73 is smaller than the region of monitor output size OPT1 being in state ST1 through the optical zoom-out, and the wide angle of the captured image is achieved. Further, the BIS movable range is changed so as to be long, the movement allowable range of imaging element 73 by shake correction mechanism 100 increases, and the occurrence frequency of vignetting is reduced.

CPU 201 instructs DSP 211 to execute the electronic zoom-up process (S3). DSP 211 executes the electronic zoom-up process (that is, the cutting process such that the current cut magnification of the captured image corresponds to a reciprocal of the decrease width of the optical zoom magnification according to the optical zoom-out) according to an instruction from CPU 201 (S3A). Accordingly, for example, as represented in state ST3 of FIG. 15, CPU 201 can cause DSP 211 to acquire the captured image of the region of the same monitor output size OPT3 as the size of the region of the monitor output size being in state ST1, and can acquire a high-quality captured image having no much change with the eye of human.

As stated above, surveillance camera 200A according to the present exemplary embodiment includes shake correction mechanism 100 which is fixed to the fixing target surface, is provided in the place in which shaking occurs on the fixing target surface, holds element holder 67 which holds imaging element 73, and performs the shake correction on the captured image captured by imaging element 73 through the driving of element holder 67 based on the detection value (that is, shake angle $\Delta\theta$) of gyro sensor GY. Surveillance camera 200A causes lens unit LZU to change the optical zoom magnification of zoom lens Z2 based on the detection value (that is, shake angle $\Delta\theta$) of gyro sensor GY, electronically performs a zoom process (that is, a process of electronically zooming in and cutting the image) on a part of the captured image on which the shake correction is performed by shake correction mechanism 100 according to the changed optical zoom magnification, and outputs the cut part of the captured image.

Accordingly, even when the device main body of surveillance camera 200A is provided in a place in which the device shakes, surveillance camera 200A according to the present exemplary embodiment can effectively suppress the degradation in the quality of the captured image captured by imaging element 73 with a simple configuration by simultaneously performing the optical zoom control (for example, optical zoom-out) and the electronic zoom control (for example, electronic zoom-in) according to the shake of surveillance camera 200A. Since surveillance camera 200A can suppress the degradation in the quality of the captured image, it is possible to prevent reliability as the data of the captured image from being degraded.

Surveillance camera 200A outputs a control signal (an example of a first control signal) for decreasing the optical zoom magnification of zoom lens Z2 to lens unit LZU, and cuts a part of the captured image on which the shake correction is performed by shake correction mechanism 100 through the zoom-in process. Accordingly, surveillance camera 200A can set a region (that is, monitor output size) used as the captured image to be smaller than the region of the monitor output size being in a state before the optical zoom-out and can acquire a wider BIS movable range through the optical zoom-out. Thus, it is possible to increase the movement allowable length of imaging element 73 by shake correction mechanism 100, and it is possible to reduce the occurrence frequency of vignetting. Surveillance camera 200A can acquire the captured image of the region of the same monitor output size as the size of the region of the monitor output size being in a state before the optical zoom-out, and can acquire a high-quality captured image having no much change with the eye of human.

Surveillance camera 200A stores movable amount information acquired by associating the optical zoom magnification of zoom lens Z2 with the movable amount (BIS movable range) of imaging element 73 based on the driving of element holder 67 in memory 203. According to the determination that the movement amount of imaging element 73 based on the detection value (that is, shake angle $\Delta\theta$) of gyro sensor GY exceeds the BIS movable range corresponding to the optical zoom magnification of zoom lens Z2, surveillance camera 200A causes lens unit LZU to change the optical zoom magnification of zoom lens Z2, cuts the part of the captured image on which the shake correction is performed by shake correction mechanism 100 through the electronic zoom-in process, and outputs the cut part of the captured image. Accordingly, when the movement amount (that is, BIS shake correction amount) of imaging element 73 based on the detection value (that is, shake angle $\Delta\theta$) of gyro sensor GY is within the BIS movable range at the same optical zoom magnification, surveillance camera 200A can acquire high-accurate captured image without causing slight degradation in the resolution of the captured image through the optical zoom-out and the electronic zoom-in. When the movement amount (that is, BIS shake correction amount) of imaging element 73 based on the detection value (that is, shake angle $\Delta\theta$) of gyro sensor GY exceeds the BIS movable range at the same optical zoom magnification, surveillance camera 200A can acquire the captured image having resolution having no much change with the eye of human after the electronic zoom-in while increasing a compensation range of the BIS shake correction amount due to the maximization of the BIS movable range through the optical zoom-out and the electronic zoom-in.

Surveillance camera 200A cuts the part of the captured image on which the shake correction is performed by shake correction mechanism 100 through the electronic zoom process using a ratio between the optical zoom magnification of zoom lens Z2 before the change and the optical zoom magnification of zoom lens Z2 after the change. Accordingly, for example, surveillance camera 200A can acquire the captured image having substantially the same quality as the high-accurate captured image captured in state ST1 shown in FIG. 15 with the eye of human. Surveillance camera 200A stores the change rate information acquired by associating the detection values (that is, shake angles $\Delta\theta$) of gyro sensor GY with the change rates of the optical zoom magnification of the zoom lens within lens unit LZU for each detection time for a predetermined period of time in memory 203. Surveillance camera 200A causes lens unit LZU to change the optical zoom magnification of the zoom lens by using the maximum value of the change rates of the optical zoom magnification of the zoom lens which are included in the change rate information. Accordingly, for example, surveillance camera 200A can acquire a wide BIS movable range after the optical zoom-out and can suppress the degradation in the quality of the captured image through the shake correction in shake correction mechanism 100 by using the maximum value of the decrease width of the optical zoom magnification when surveillance camera 200A largely shakes.

Surveillance camera 200A stores the change rate information acquired by associating the detection value (that is, shake angle $\Delta\theta$) of gyro sensor GY with the change rate of the optical zoom magnification of the zoom lens within lens unit LZU for each detection time for a predetermined period of time in memory 203. Surveillance camera 200A causes lens unit LZU to change the optical zoom magnification of the zoom lens by using the average value of the change rates of the optical zoom magnification of the zoom lens which are included in the change rate information. Accordingly, surveillance camera 200A can stably acquire the BIS movable range in which a variation is slight after the optical zoom-out and can suppress the degradation in the quality of the captured image through the shake correction in shake correction mechanism 100 by using an average value of the decrease widths of the optical zoom magnification when surveillance camera 200A normally shakes.

Surveillance camera 200A stores the change rate information acquired by associating the detection value (that is, shake angle $\Delta\theta$) of gyro sensor GY with the change rate of the optical zoom magnification of the zoom lens within lens unit LZU for each detection time for a predetermined period of time in memory 203. Surveillance camera 200A causes lens unit LZU to change the optical zoom magnification of the zoom lens by using a temporal change of the change rate of the optical zoom magnification of the zoom lens which is included in the change rate information. Accordingly, for example, when the shake of surveillance camera 200A has specific time dependency or seasonal dependency, CPU 201 can stably acquire the BIS movable range after the optical zoom-out suitable for the time dependency or seasonal dependency, and can suppress the degradation in the quality of the captured image through the shake correction in shake correction mechanism 100.

In surveillance camera 200A, gyro sensor GY is attached to the housing of lens unit LZU. Accordingly, gyro sensor GY can accurately measure a parameter regarding the shake angle caused in the imaging optical system within lens unit LZU, and can contribute to accurate calculation of the BIS shake correction amount by shake correction mechanism 100.

(Background of Content of Exemplary Embodiment 3)

In the configuration of Japanese Patent Unexamined Publication No. 2014-45304, there is no consideration on a configuration in which the movement amount of the imaging element unit is controlled along with a variation (for example, a variation in the focal length caused by the replacement with lenses of which focal lengths are different at the time of the maintenance of the camera device) in the focal length of the lens as the image stabilization function of the electronic device such as the mobile phone having the camera module mounted thereon.

For example, it is assumed that the camera device such as the electronic device of Japanese Patent Unexamined Publication No. 2014-45304 is provided in the place in which the device shakes and the camera device is a lens replaceable type. In this case, in the configuration of Japanese Patent Unexamined Publication No. 2014-45304, it is necessary to input and store the information of the focal length as an example of the characteristics of the lens to be used after the replacement in the camera device whenever the lens of the camera device is replaced. Accordingly, it is difficult to reduce an effort of an operator who performs an operation (for example, an operation for inputting and storing the information of the focal length in the camera device) when the lens is replaced. When the operation of the operator is not performed, the camera device is not able to ascertain the focal length of the lens to be used after the replacement, and is difficult to appropriately control the movement amount of the imaging element unit according to the detection amount of the shake.

In Exemplary Embodiment 3 to be stated below, examples of a camera device and a shake correction method which estimate the lens characteristics changed along with the replacement of the lens with high accuracy, reduce an effort of the operator who inputs the lens characteristics, suppress the degradation in the quality of the captured image by relaxing the influence of the shake of the device main body, and prevent the reliability as the data of the imaging element from being degraded when the device main body is provided in the place in which the device shakes will be described.

Exemplary Embodiment 3

Figure 19:
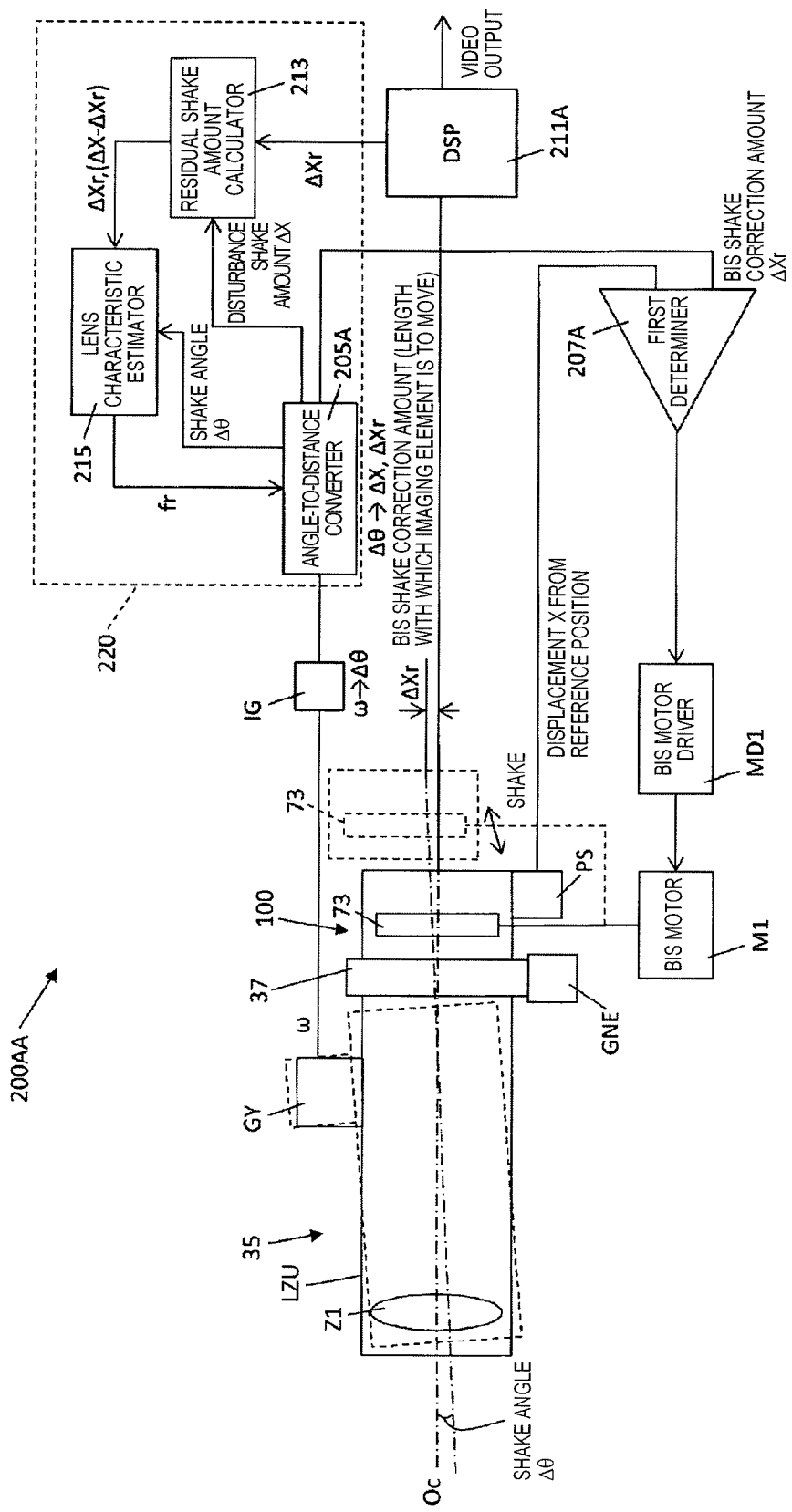
FIG. 19 is a block diagram showing an example of an internal configuration of a surveillance camera according to Exemplary Embodiment 3 in detail.

FIG. 19 is a block diagram showing an example of an internal configuration of surveillance camera 200AA according to Exemplary Embodiment 3 in detail.

In the description of surveillance camera 200AA shown in FIG. 19, parts having the same configuration as the configuration of surveillance camera 200A shown in FIG. 13 will be assigned the same references. Accordingly, the description thereof will be simplified or omitted, and thus, different contents will be described.

Surveillance camera 200AA shown in FIG. 19 lens unit 35 to which lens mount base. 37 is attached, shake correction mechanism 100 to which imaging element 73 is attached, position sensor PS, gyro sensor GY, integrator IG, coefficient estimator 220, first determiner 207A, DSP 211A, BIS motor driver MD1, and BIS motor M1. Surveillance camera 200AA may further include a vibration generation source GNE to be described below.

Although not shown in FIG. 19, surveillance camera 200AA includes a memory that operates as a random access memory (RAM) having a function of a work memory when the units of surveillance camera 200A execute processing.

Lens unit 35 includes lens unit LZU including various lenses constituting an imaging optical system of surveillance camera 200AA, and lens mount base 37. As described in Exemplary Embodiment 1, shake correction mechanism 100 is fixed to lens mount base 37.

Lens unit LZU includes at least fixed zoom lens Z1 as an example of an object lens. Subject light rays (that is, light rays reflected by the subject) are incident on zoom lens Z1. The subject light rays incident on zoom lens Z1 are formed as an image in a region within effective image circle CR1 (see FIG. 14). In the description of the following Exemplary Embodiment 3, a set of lenses including zoom lens Z1 provided within lens unit LZU is simply referred to as a "lens".

Position sensor PS detects displacement amount X from a reference position (for example, a position of imaging element 73 when optical axis Oc passes through a center of light reception surface RVL1 of imaging element 73) of imaging element 73. When imaging element 73 is not displaced (that is, is not shifted) from the reference position, an output of position sensor PS is zero (0). Position sensor PS outputs information regarding displacement amount X from a reference position of imaging element 73 to first determiner 207A.

Gyro sensor GY as an example of the shake sensor detects the shake of surveillance camera 200AA, and outputs the detected shake to integrator IG. For example, gyro sensor GY is attached so as to be fixed to a housing of lens unit LZU of lens unit 35. Gyro sensor GY detects angular velocity ω based on rotation (for example, shake angle Δθ) of lens unit LZU caused by the shake of surveillance camera 200A, as an example of a parameter indicating the shake of surveillance camera 200A (for example, lens unit LZU). Information regarding angular velocity ω detected by gyro sensor GY is input to integrator IG.

Integrator IG calculates shake angle Δθ as an example of the parameter indicating the rotation of lens unit LZU caused by the shake of surveillance camera 200AA by performing integration on angular velocity ω detected by gyro sensor GY with time, and outputs the calculated shake angle to angle-to-distance converter 205A.

When surveillance camera 200AA is in a lens characteristic estimation mode, coefficient estimator 220 acquires information regarding the current BIS shake correction amount (that is, the shake correction amount of the captured image along with the driving of imaging element 73 by shake correction mechanism 100) calculated by DSP 211A and information regarding shake angle Δθ calculated by integrator IG. Coefficient estimator 220 estimates a coefficient (that is, a coefficient for calculating an optimum BIS shake correction amount from the shake angle) to be set for angle-to-distance converter 205A based on the information regarding the current BIS shake correction amount and the information regarding the shake angle Δθ.

For example, the lens characteristic estimation mode is a mode in which the lenses within lens unit LZU are replaced in whole or part by an operator (user) at the time of maintenance, and thus, surveillance camera 200AA autonomously estimates information (for example, focal length) regarding the characteristic of the lens within lens unit LZU by using vibration caused by an environment (disturbance) in which surveillance camera 200AA is provided. In other words, surveillance camera 200AA autonomously estimates the information (for example, focal length) regarding the characteristics of the lens within lens unit LZU in the lens characteristic estimation mode.

In the lens characteristic estimation mode, surveillance camera 200AA may autonomously estimate the information (for example, focal length) regarding the characteristics of the lens within lens unit LZU after the vibration such as disturbance is generated by vibration generation source GNE included in surveillance camera 200AA without being limited to a case where the vibration caused by the environment (disturbance) in which surveillance camera 200AA is provided is used. For example, vibration generation source GNE is attached so as to be fixed to lens mount base 37. Vibration generation source GNE is not limited to be attached to lens mount base 37, and may be attached so as to be fixed to, for example, the housing of lens unit LZU.

For example, the lens characteristic estimation mode is changed from a normal mode based on a remote operation of the operator (user) who uses a user terminal (for example, personal computer (PC)) connected so as to communicate with surveillance camera 200AA via a network (not shown), and is returned to a normal mode through the cancellation of the lens characteristic estimation mode based on the same remote operation. For example, the normal mode is an operation mode at the time of so-called normal surveillance in which the lenses within lens unit LZU are not replaced in whole or part and it is not necessary to estimate the information (for example, focal length) regarding the characteristics of the same lens.

When a residual shake amount (to be described below) is greater than a predetermined threshold, surveillance camera 200AA may predict that the lenses will be replaced in whole or part, and may automatically change the lens characteristic estimation mode. Surveillance camera 200AA may estimate the information (for example, focal length) regarding the characteristics of the lens within lens unit LZU in the lens characteristic estimation mode, and may change from the lens characteristic estimation mode to the normal mode when the setting of the coefficient based on the estimation result for angle-to-distance converter 205A is finished.

Coefficient estimator 220 includes angle-to-distance converter 205A, residual shake amount calculator 213, and lens characteristic estimator 215. In Exemplary Embodiment 2, for example, when the lenses within lens unit LZU are replaced at the time of maintenance, information (for example, focal length) regarding the characteristics of a new lens after the replacement needs to be input and stored in memory 203 through the operation of the user (operator). However, an effort to input the information regarding the characteristics of a new lens to memory 203 is a troublesome operation, and the effort needs to be reduced.

In Exemplary Embodiment 3, for example, when the lenses within lens unit LZU are replaced in whole or part at the time of maintenance, coefficient estimator 220 estimates the information (for example, focal length) regarding the characteristics of the lens after the replacement in the lens characteristic estimation mode, and estimates a coefficient to be set for angle-to-distance converter 205A by using the estimation result. For example, the coefficient to be set for angle-to-distance converter 205A is a coefficient for calculating the optimum BIS shake correction amount from the shake angle. Coefficient estimator 220 sets the estimated coefficient for angle-to-distance converter 205A. Accordingly, when the lenses are replaced in whole or part by the operator (user), coefficient estimator 220 may set the coefficient for calculating the optimum BIS shake correction amount from the shake angle for angle-to-distance converter 205A without inputting the information (for example, focal length) regarding the characteristics of the lens within lens unit LZU in a memory (not shown).

When the lenses within lens unit LZU are replaced in whole or part, the necessity of estimating the focal length of the lens will be described with reference to FIG. 20.

FIG. 20 is an explanatory diagram showing that a BIS shake displacement amount to be corrected is different according to a difference between focal lengths.

In FIG. 20, f1 is a focal length of the lens before the replacement, and f2 is a focal length of the lens after the replacement. For example, when surveillance camera 200AA shakes and the shake angle based on the detection value of gyro sensor GY is one degree (1°), if a distance (that is, focal length) from the final lens to the light reception surface of imaging element 73 is different by replacing the lenses in whole or part, BIS shake correction amount by shake correction mechanism 100 is also changed from Δx1 to Δx2 (increases in the example of FIG. 20) along with the shake of surveillance camera 200AA. Even though such a change is not followed and the shake correction is performed by shake correction mechanism 100 in a state in which BIS shake correction amount is not Δx2 but Δx1, the shake correction is not performed on the captured image captured by imaging element 73, and the quality of the captured image is degraded.

Accordingly, when the lenses are replaced in whole or part at the time of maintenance, it is necessary to estimate the information (for example, focal length) regarding the characteristics of the lens within lens unit LZU after the replacement.

In the normal mode (in other words, the information (for example, when focal length) regarding the characteristics of the currently mounted lens within lens unit LZU is stored in a memory (not shown) and is known), angle-to-distance converter 205A as an example of a controller reads and acquires the information (for example, focal length) regarding the characteristics of the lens, and acquires the information regarding shake angle Δθ output from integrator IG. Angle-to-distance converter 205A as an example of a coefficient calculator converts shake angle Δθ into a length (BIS shake correction amount) on which the shake correction is performed by shake correction mechanism 100 so as to correspond to shake angle Δθ according to Expression (2) by using the information (for example, focal length) regarding the characteristics of the known lens and shake angle Δθ. In Expression (2), ΔX0 represents a BIS shake correction amount, f0 represents a focal length of a known lens, and G0 is a fixed value.

[Expression 2]

$$\Delta X0 = G0 \times f0 \times \tan(\Delta\theta) \qquad (2)$$

That is, when shake angle Δθ is detected along with the shake of surveillance camera 200AA, angle-to-distance converter 205A may calculate the driving amount for driving imaging element 73 to a side opposite to the direction in which surveillance camera 200AA shakes s the BIS shake correction amount in order to cancel the influence of the shake of shake angle Δθ.

In the lens characteristic estimation mode (in other words, when the information (for example, focal length) regarding the characteristics of the currently mounted lens within lens unit LZU is not stored in a memory (not shown) and is not known. the same applies in later), angle-to-distance converter 205A as an example of a controller acquires the information regarding shake angle Δθ output from integrator IG and the information regarding focal length fr output from lens characteristic estimator 215. Angle-to-distance converter 205A converts shake angle Δθ into disturbance shake amount ΔX due to the shake of surveillance camera 200AA according to Expression (3) by using focal length fr output from lens characteristic estimator 215 and shake angle Δθ. In Expression (3), ΔX represents a disturbance shake amount, fr represents a focal length of a non-known lens (in other words, a lens after the replacement), and G0 is a fixed value.

[Expression 3]

$$\Delta X = G0 \times fr \times \tan(\Delta\theta) \qquad (3)$$

In the lens characteristic estimation mode, angle-to-distance converter 205A outputs, as disturbance shake amount ΔX based on the detection value of gyro sensor GY, disturbance shake amount ΔX calculated according to Expression (3) to residual shake amount calculator 213, and outputs the information regarding BIS shake correction amount ΔXr to first determiner 207A by using disturbance shake amount ΔX as BIS shake correction amount ΔXr. In the lens characteristic estimation mode, angle-to-distance converter 205A outputs the information regarding shake angle Δθ output from integrator IG to lens characteristic estimator 215.

Residual shake amount calculator 213 acquires the information regarding current BIS shake correction amount ΔXr (that is, the shake correction amount of the captured image along with the driving of imaging element 73 by shake correction mechanism 100) calculated by DSP 211A and disturbance shake amount ΔX based on the detection value of gyro sensor GY output from angle-to-distance converter 205A. Residual shake amount calculator 213 calculates a difference (ΔX−ΔXr) between disturbance shake amount ΔX and current BIS shake correction amount ΔXr, as a residual shake amount appearing on the captured image captured by imaging element 73. Residual shake amount calculator 213 outputs information items regarding current BIS shake correction amount ΔXr and the difference (ΔX−ΔXr) which is the residual shake amount to lens characteristic estimator 215.

Lens characteristic estimator 215 as an example of a specific estimator acquires the information items regarding current BIS shake correction amount ΔXr and the difference (ΔX−ΔXr) which is the residual shake amount output from residual shake amount calculator 213.

When there is no residual shake amount (that is, zero) (see FIG. 21A), lens characteristic estimator 215 sets focal length fr (that is, focal length fr calculated according to Expression (4) in a previous timing) used in the calculation of the BIS shake correction amount used in the current shake correction in shake correction mechanism 100 for angle-to-distance converter 205A, as the focus length of the lens after the replacement.

Figure 21A:
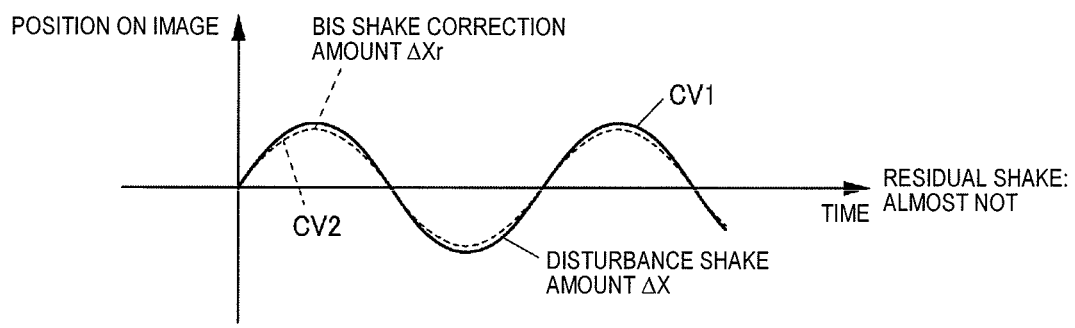
FIG. 21A is a graph showing an example of the relationship between a BIS shake correction amount and a disturbance shake amount in a state in which there is almost no residual shake amount.

FIG. 21A is a graph showing an example of the relationship between the BIS shake correction amount and the disturbance shake amount in a state in which there is almost no residual shake amount.

A horizontal axis in FIG. 21A depicts a time, and a vertical axis in FIG. 21A depicts a position on the captured image. Waveform CV1 represents disturbance shake amount ΔX, and waveform C2 represents BIS shake correction amount ΔXr. In FIG. 21A, since waveforms CV1 and CV2 match each other with the lapse of time, disturbance shake amount ΔX and BIS shake correction amount ΔXr match each other, and there is no residual shake amount. Accordingly, in the state of FIG. 21A, in coefficient estimator 220, an optimum coefficient for converting from shake angle Δθ to BIS shake correction amount ΔXr is set for angle-to-distance converter 205A.

When there is the residual shake amount (see FIG. 21B or 21C), lens characteristic estimator 215 estimates focal length fr of the lens after the replacement according to Expression (4) by using the information regarding current BIS shake correction amount ΔXr output from residual shake amount calculator 213 and the information regarding shake angle Δθ output from angle-to-distance converter 205A. Lens characteristic estimator 215 provisionally sets the estimation result of focal length fr for angle-to-distance converter 205A, and continues the calculation of focal length fr using Expression (4) and the setting for angle-to-distance converter 205A until the residual shake amount output from residual shake amount calculator 213 is exhausted (that is, becomes zero).

[Expression 4]

$$fr = \Delta Xr / G0 \times \tan(\Delta\theta) \qquad (4)$$

Figure 21B:
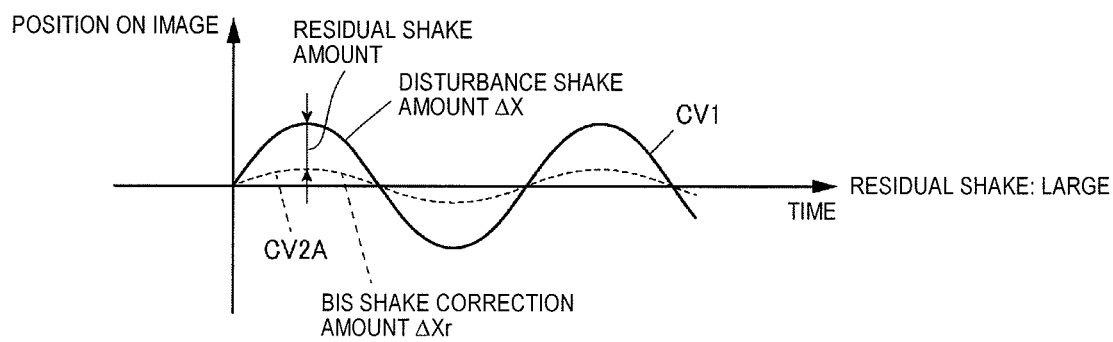
FIG. 21B is a graph showing an example of the relationship between the BIS shake correction amount and the disturbance shake amount in a state in which the BIS shake correction amount is insufficient.
Figure 21C:
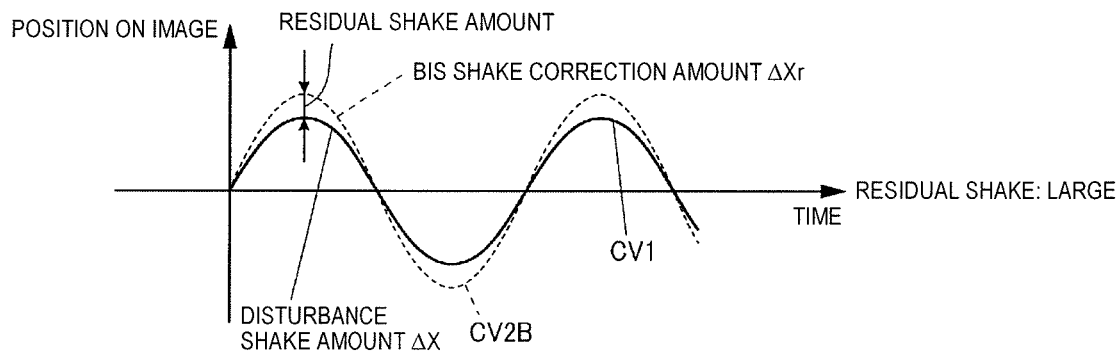
FIG. 21C is a graph showing an example of the relationship between the BIS shake correction amount and the disturbance shake amount in a state in which the BIS shake correction amount is excessive.

FIG. 21B is a graph showing an example of the relationship between BIS shake correction amount ΔXr and disturbance shake amount ΔX in a state in which BIS shake correction amount ΔXr is insufficient. FIG. 21C is a graph showing an example of the relationship between BIS shake correction amount ΔXr and disturbance shake amount ΔX in a state in which BIS shake correction amount ΔXr is excessive.

A horizontal axis in FIGS. 21B and 21C depicts a time, and a vertical axis in FIGS. 21B and 21C depicts a position on the captured image. Waveform CV1 represents disturbance shake amount ΔX, and waveforms CV2A and CV2B represent BIS shake correction amounts ΔXr.

In FIG. 21B, waveforms CV1 and CV2A do not match each other with the lapse of time, the shake correction of BIS shake correction amount ΔXr by shake correction mechanism 100 is not sufficient, and the residual shake amount (that is, difference (ΔX−ΔXr)) is large. Thus, lens characteristic estimator 215 continues the calculation of focal length fr using Expression (4) and the setting for angle-to-distance converter 205A until the residual shake amount output from residual shake amount calculator 213 is exhausted (that is, entering the state of FIG. 21A).

In FIG. 21C, waveforms CV1 and CV2B do not match each other with the lapse of time, the shake correction of BIS shake correction amount ΔXr by shake correction mechanism 100 is excessive, and the residual shake amount (that is, difference (ΔX−ΔXr)) is similarly large. Thus, lens characteristic estimator 215 continues the calculation of focal length fr using Expression (4) and the setting for angle-to-distance converter 205A until the residual shake amount output from residual shake amount calculator 213 is exhausted (that is, entering the state of FIG. 21A).

First determiner 207A as an example of a controller acquires the information regarding displacement X output from position sensor PS and the information regarding BIS shake correction amount ΔXr output from angle-to-distance converter 205A. For example, first determiner 207A calculates a difference (ΔXr−X) between BIS shake correction amount ΔXr and displacement amount X, generates a control signal of the shake correction using the information regarding the BIS shake correction amount by using the calculation result as the BIS shake correction amount for moving imaging element 73, and outputs the generated control signal to BIS motor driver MD1.

It is considered that the calculation process of first determiner 207A has the following technical significance. Specifically, BIS shake correction amount ΔXr is a value calculated along with the shake (rotation) of lens unit LZU, and the movement amount of imaging element 73 along with the shake (rotation) of lens unit LZU is offset (that is, added). Accordingly, first determiner 207A can calculate an accurate BIS shake correction amount (that is, a length to which imaging element 73 is to move) of imaging element 73 along with the shake (in other words, the shake of lens unit LZU) of surveillance camera 200A by performing a process of subtracting an offset amount (that is, displacement amount X).

When displacement amount X is equal to or less than a predetermined value which is stored in a memory (not shown) or is retained in advance in first determiner 207A itself, first determiner 207A may omit the process of subtracting displacement amount X, may generate the control signal of the shake correction using the information regarding BIS shake correction amount ΔXr output from angle-to-distance converter 205A, and may output the generated control signal to BIS motor driver MD1.

For example, DSP 211A as an example of a shake correction amount calculator acquires the captured image output from the signal processor (not shown) in the normal mode, generates video data based on the captured image by performing predetermined processing, and outputs the video data to a later stage (not shown, and for example, a communicator communicating with an external device connected to surveillance camera 200AA). The signal processor (not shown) may be omitted. In this case, the electrical signals output from imaging element 73 are directly input to DSP 211A, and the captured image which is the image signal (for example, the image signal in RGB format or YUV format) for each frame is generated in DSP 211A through the predetermined signal processing.

For example, in the lens characteristic estimation mode, DSP 211A acquires BIS shake correction amount ΔXr (that is, the shake correction amount of the captured image along with the driving of imaging element 73 by shake correction mechanism 100) indicating a degree of the current shake correction in shake correction mechanism 100 by analyzing the data of the captured image based on the data of the captured image acquired from the signal processor (not shown) or the captured image generated in the DSP itself. DSP 211A outputs the information regarding BIS shake correction amount ΔXr indicating the degree of the current shake correction in shake correction mechanism 100 to residual shake amount calculator 213. DSP 211A may also be included in coefficient estimator 220.

BIS motor driver MD1 generates a control signal for activating BIS motor M1 based on the control signal output from first determiner 207A, and outputs the generated control signal to BIS motor M1. BIS motor driver MD1 causes shake correction mechanism 100 to execute the shake correction of the BIS shake correction amount determined in first determiner 207A by controlling BIS motor M1 based on the control signal. That is, for example, BIS motor driver MD1 moves element holder 67 that holds imaging element 73 in the direction opposite to the direction in which surveillance camera 200AA shakes as much as the BIS shake correction amount by controlling proportional integral differential (PID) control.

BIS motor M1 causes shake correction mechanism 100 to execute the shake correction of the BIS shake correction amount determined in first determiner 207A based on the control signal output from BIS motor driver MD1. Accordingly, when shake angle Δθ is detected along with the shake of surveillance camera 200AA, shake correction mechanism 100 including BIS motor driver MD1 or BIS motor M1 can cancel or relax the influence of the shake by moving imaging element 73 as much as the length of the BIS shake correction amount acquired according to shake angle Δθ, and can suppress the degradation in the quality of the captured image.

Hereinafter, an operation procedure of coefficient estimator 220 in the lens characteristic estimation mode of surveillance camera 200AA will be described with reference to FIG. 22.

FIG. 22 is a flowchart showing an example of the operation procedure of coefficient estimator 220 in the lens characteristics estimation mode of surveillance camera 200AA according to Exemplary Embodiment 3 in detail.

In FIG. 22, angle-to-distance converter 205A acquires the information regarding shake angle Δθ output from integrator IG and the information regarding focal length fr output from lens characteristic estimator 215 (S11). Angle-to-distance converter 205A converts shake angle Δθ into disturbance shake amount ΔX due to the shake of surveillance camera 200AA according to Expression (3) by using focal length fr output from lens characteristic estimator 215 and shake angle Δθ. Angle-to-distance converter 205A outputs disturbance shake amount ΔX calculated according to Expression (3), as disturbance shake amount ΔX based on the detection value of gyro sensor GY, to residual shake amount calculator 213, and outputs the information regarding BIS shake correction amount ΔXr to first determiner 207A by using disturbance shake amount ΔX as BIS shake correction amount ΔXr. The shake correction is performed by shake correction mechanism 100 based on BIS shake correction amount ΔXr.

Residual shake amount calculator 213 acquires the information regarding current BIS shake correction amount ΔXr (that is, the shake correction amount of the captured image along with the driving of imaging element 73 by shake correction mechanism 100) calculated by DSP 211A and disturbance shake amount ΔX based on the detection value of gyro sensor GY output from angle-to-distance converter 205A (S12).

Residual shake amount calculator 213 calculates the difference (ΔX−ΔXr) between disturbance shake amount ΔX and current BIS shake correction amount ΔXr, as the residual shake amount appearing on the captured image captured by imaging element 73 (S13). Residual shake amount calculator 213 outputs information items regarding current BIS shake correction amount ΔXr and the difference (ΔX−ΔXr) which is the residual shake amount to lens characteristic estimator 215.

Lens characteristic estimator 215 acquires the information items regarding current BIS shake correction amount ΔXr and the difference (ΔX−ΔXr) which is the residual shake amount output from residual shake amount calculator 213, and determines whether or not the residual shake amount is a minimum value (for example, zero) (S14).

When it is determined that the residual shake amount is not the minimum value (S14, NO), lens characteristic estimator 215 provisionally calculates and estimates focal length fr of the lens after the replacement according to Expression (4) by using the information regarding current BIS shake correction amount ΔXr output from residual shake amount calculator 213 and the information regarding shake angle Δθ output from angle-to-distance converter 205A (S15). Lens characteristic estimator 215 provisionally sets the estimation result of focal length fr for angle-to-distance converter 205A. Accordingly, BIS shake correction amount ΔXr is calculated by angle-to-distance converter 205A according to Expression (3) based on provisionally calculated focal length fr of the lens, and the shake correction is performed in shake correction mechanism 100 based on BIS shake correction amount ΔXr (S15A). After the process of step S15A, the process of coefficient estimator 220 is returned to step S12.

When it is determined that the residual shake amount is the minimum value (S14, YES), lens characteristic estimator 215 sets focal length fr (that is, focal length fr calculated according to Expression (4) in a previous timing) used in the calculation of the BIS shake correction amount used in the current shake correction in shake correction mechanism 100, as the focal length of the lens after the replacement, for angle-to-distance converter 205A (S16). Accordingly, an operation of causing coefficient estimator 220 to calculate the coefficient for calculating the optimum BIS shake correction amount from the shake angle and to set the calculated coefficient in the lens characteristic estimation mode. Thereafter, for example, in the lens characteristic estimation mode, surveillance camera 200AA may generate a message indicating that the calculation of the coefficient for calculating the optimum shake correction amount from the shake angle is ended, and may notify an external device (for example, a user terminal such as PC) connected to surveillance camera 200AA via a network (not shown). For example, the operator (user) who recognizes the notification can change from the lens characteristic estimation mode of surveillance camera 200AA to the normal mode through the remote operation by operating the user terminal.

As stated above, surveillance camera 200AA according to the present exemplary embodiment includes shake correction mechanism 100 which is fixed to the fixing target surface, is disposed in the place in which shaking occurs on the fixing target surface, holds element holder 67 which holds imaging element 73, and performs the shake correction on the captured image captured by imaging element 73 through the driving of element holder 67 based on the detection value (that is, shake angle Δθ of gyro sensor GY. Surveillance camera 200AA estimates the specification of the lens (for example, focal length) based on the detection value (that is, shake angle Δθ) of gyro sensor GY and BIS shake correction amount ΔXr of shake correction mechanism 100. Surveillance camera 200AA causes shake correction mechanism 100 to drive element holder 67 by using the detection value (that is, shake angle Δθ) of gyro sensor GY and the estimation result of the characteristics (for example, focal length) of the lens.

Accordingly, for example, when the device main body of surveillance camera 200AA is provided in the place in which the device shakes, since surveillance camera 200AA according to the exemplary embodiment can estimate the lens characteristics changed along with the replacement of the lens with high accuracy, it is possible to reduce an effort of the operator who inputs the lens characteristics. For example, since surveillance camera 200AA can estimate the lens characteristics (for example, focal length) changed along with the replacement of the lens, it is possible to achieve the shake correction in which the influence of the shake of the device main body of surveillance camera 200AA is canceled or relaxed. Thus, it is possible to suppress the degradation in the quality of the captured image, and it is possible to prevent the reliability as the data of the imaging element from being degraded.

Surveillance camera 200AA further includes DSP 211A as an example of the shake correction amount calculator which calculates the current BIS shake correction amount by shake correction mechanism 100 based on the captured image on which the shake correction is performed, and residual shake amount calculator 213 which calculates the residual shake amount of the captured image on which the shake correction is performed based on the calculated BIS shake correction amount and the detection value (that is, shake angle Δθ) of gyro sensor GY. Surveillance camera 200AA determines whether or not it is necessary to estimate the characteristics (for example, focal length) of the lens based on the calculated residual shake amount of the captured image. Accordingly, when there is no residual shake amount, since the shake correction is optimally performed by shake correction mechanism 100, surveillance camera 200AA may determine that it is not necessary to estimate the characteristics (for example, focal length) of the lens after the replacement, and may reduce a load. When there is the residual shake amount, since it is determined that the optimum shake correction is not performed by shake correction mechanism 100, surveillance camera 200AA can determine that it is necessary to further estimate the characteristics (for example, focal length) of the lens after the replacement, and may contribute to the calculation of the optimum BIS shake correction amount.

Surveillance camera 200AA calculates a coefficient for converting the detection value (that is, shake angle Δθ) of gyro sensor GY into BIS shake correction amount ΔXr of shake correction mechanism 100 by using the estimation result of the characteristics (for example, focal length) of the lens when the calculated residual shake amount of the captured image is a predetermined minimum value. Accordingly, when there is no residual shake amount, since the optimum shake correction is performed by shake correction mechanism 100, surveillance camera 200AA can calculate an optimum coefficient for converting the detection value (that is, shake angle Δθ) of gyro sensor GY into BIS shake correction amount ΔXr of shake correction mechanism 100 by using the characteristics (for example, focal length) of the lens used in the calculation of the BIS shake correction amount required in the shake correction.

Surveillance camera 200AA repeatedly estimates the characteristics of the lens based on the residual shake amount of the captured image after the shake correction is performed in shake correction mechanism 100 by using the estimation result of the characteristics (for example, focal length) of the lens until the calculated residual shake amount of the captured image becomes a predetermined minimum value. Accordingly, when there is the residual shake amount, since it is determined that the optimum shake correction is not performed by shake correction mechanism 100, surveillance camera 200AA can continue the estimation of the characteristics (for example, focal length) of the lens after the replacement until there is no residual shake amount, and can accurately acquire the coefficient for calculating the optimum BIS shake correction amount.

In surveillance camera 200AA, gyro sensor GY is attached to the housing of lens unit LZU. Accordingly, gyro sensor GY can accurately measure a parameter regarding the shake angle caused in the imaging optical system within lens unit LZU, and can contribute to accurate calculation of the BIS shake correction amount by shake correction mechanism 100.

Although various exemplary embodiments have been described with reference to the drawings, the present invention is not limited to these exemplary embodiments. It is to be appreciated to those skilled in the art that variations and modifications may be made without departing from the scope described in claims, and it is should be understood that these variations or modifications are included in the technical scope of the present invention. The constituent elements of the exemplary embodiments may be arbitrarily combined without departing from the gist of the invention.

The present disclosure is useful as a camera device and a shake correction method which prevents reliability as data of an imaging element from being degraded by estimating lens characteristics changed along with replacement of a lens with high accuracy, reducing an effort of a user who inputs the lens characteristics, and suppressing degradation in quality of a captured image through relaxing of influence of shake of a device main body when the device main body is provided in a place in which the device shakes.

What is claimed is:

1. A camera device which is a fixed to a fixing target surface, and is provided in a place in which shaking occurs on the fixing target surface, the camera device comprising:
   a lens on which subject light is incident;
   an imaging element that images an image based on the subject light;
   a sensor that detects shake of the camera device;
   a shake correction mechanism that holds a holder which holds the imaging element, and performs shake correction on a captured image captured by the imaging element through driving of the holder based on a detection value of the sensor; and
   a processor configured to perform operations including:
      calculating a current shake correction amount based on an estimated focal length of the lens;
      acquiring a disturbance shake amount based on the detection value of the sensor;
      calculating, as a residual shake amount, a difference between the disturbance shake amount and the current shake correction amount;
      determining whether the residual shake amount is a predetermined value;
      when the residual shake amount is the predetermined value, setting the estimated focal length used in the calculating of the current shake correction amount as the focal length of the lens; and
      when the residual shake amount is not the predetermined value, changing the estimated focal length of the lens based on the current shake correction amount, and repeating the operations.

2. The camera device of claim 1,
   wherein the processor calculates the current shake correction amount of the shake correction mechanism further based on the captured image on which the shake correction is performed, and
   the processor determines whether or not it is necessary to change the estimated focal length of the lens based on the calculated residual shake amount on the captured image.

3. The camera device of claim 2,
   wherein, in the calculating of the current shake correction amount, a coefficient for converting the detection value of the sensor into the current shake correction amount of the shake correction mechanism is calculated by using the estimated focal length of the lens.

4. The camera device of claim 1,
   wherein the sensor is attached to a housing of a lens unit including the lens.

5. The camera device of claim 1, wherein the operations further include:
   when the residual shake amount is not the predetermined value, performing the shake correction by the shake correction mechanism after changing the estimated focal length based on the current shake correction amount and before calculating the current shake correction amount during the repeating of the operations.

6. A shake correction method using a camera device which is fixed to a fixing target surface and is provided in a place in which shaking occurs on the fixing target surface, the shake correction method comprising:
   imaging an image based on subject light by an imaging element;
   detecting shake of the camera device;
   performing shake correction on a captured image captured by the imaging element through driving of a holder which holds the imaging element based on a detection value of the detected shake of the camera device; and
   perform, by a processor, operations including;
      calculating a current shake correction amount based on an estimated focal length of the lens;
      acquiring a disturbance shake amount based on the detection value of the sensor;
      calculating, as a residual shake amount, a difference between the disturbance shake amount and the current shake correction amount;
      determining whether the residual shake amount is a predetermined value;
      when the residual shake amount is the predetermined value, setting the estimated focal length used in the calculating of the current shake correction amount as the focal length of the lens; and
      when the residual shake amount is not the predetermined value, changing the estimated focal length of the lens based on the current shake correction amount, and repeating the operations.

* * * * *